(12) United States Patent
Prokopenko et al.

(10) Patent No.: US 7,188,355 B1
(45) Date of Patent: Mar. 6, 2007

(54) TELEVISION PROGRAM RECOMMENDATION SYSTEM

(75) Inventors: Mikhail Prokopenko, Sydney (AU); Dong Mei Zhang, Sydney (AU); Wait Yat Wong, Sydney (AU); Farhad Fuad Islam, Sydney (AU); Ryszard Kowalczyk, Melbourne (AU); Michael Alexander Oldfield, Sydney (AU); Marc Butler, Sydney (AU); Paul Trayers, Dublin (IE)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 09/668,465

(22) Filed: Sep. 25, 2000

(30) Foreign Application Priority Data

| Sep. 30, 1999 | (AU) | ................................. PQ3217 |
| Jul. 3, 2000 | (AU) | ................................. PQ8529 |

(51) Int. Cl.
- G06F 3/00 (2006.01)
- G06F 13/00 (2006.01)
- H04N 5/445 (2006.01)

(52) U.S. Cl. ............................. 725/46; 725/14; 725/61
(58) Field of Classification Search ................. 725/46, 725/61, 14; 382/225; 707/3, 6
See application file for complete search history.

(56) References Cited

U.S. PATENT DOCUMENTS

| 5,410,344 | A | * | 4/1995 | Graves et al. ................. 725/46 |
| 5,585,865 | A | * | 12/1996 | Amano et al. ................. 725/14 |
| 5,694,176 | A | * | 12/1997 | Bruette et al. ................. 725/43 |
| 5,749,081 | A | * | 5/1998 | Whiteis ....................... 707/102 |
| 5,754,939 | A | * | 5/1998 | Herz et al. ................. 455/3.04 |

(Continued)

FOREIGN PATENT DOCUMENTS

EP 0 774 866 5/1997

(Continued)

OTHER PUBLICATIONS

"Cluster Analysis", [online] [retrieved on Oct. 11, 2003] Retrieved from the Internet Archive (WayBack Machine) using Internet <URL: http://web.archive.org/web/19980213173424/http://www.statsoftinc.com/textbook/stcluan.html>.*

(Continued)

*Primary Examiner*—Scott E. Beliveau
(74) *Attorney, Agent, or Firm*—Fitzpatrick, Cella, Harper & Scinto

(57) ABSTRACT

The present invention relates to a television system (50) and a method for automatically suggesting suitable programs to a viewer from a large number of available programs. The system (50) includes a DTV-agent system (21). Title information and characteristics of programs are made available as EPG (Electronic Program Guide) data, which including at least one Electronic Program Guide Database (22). A learning module (39) records characteristics associated with each program viewed by the user, and forms sets of these characteristics. The frequency of occurrence of each set is also determined. A recommendation module (40) uses a number of tasks to compile a list of viewer recommendations (67). Various tasks are defined, with each task defining a unique combination of a manner of ordering the viewer profile (500), and particular Relevance Filters for filtering the ordered viewer profile. Upon entry of a user request for a list of program recommendations (67), a search is performed of the EPG data for programs with characteristics that best match sets selected by the task(s). The user is notified of the availability such programs, allowing selection of a particular program.

14 Claims, 30 Drawing Sheets

U.S. PATENT DOCUMENTS

| | | | | |
|---|---|---|---|---|
| 5,758,257 | A | * | 5/1998 | Herz et al. .................. 725/116 |
| 5,758,259 | A | * | 5/1998 | Lawler ........................ 725/45 |
| 5,867,226 | A | * | 2/1999 | Wehmeyer et al. ........... 725/46 |
| 5,884,282 | A | * | 3/1999 | Robinson ..................... 705/27 |
| 6,005,597 | A | * | 12/1999 | Barrett et al. ................. 725/46 |
| 6,026,397 | A | * | 2/2000 | Sheppard ....................... 707/5 |
| 6,317,881 | B1 | * | 11/2001 | Shah-Nazaroff et al. ...... 725/24 |
| 6,438,752 | B1 | * | 8/2002 | McClard ...................... 725/46 |
| 6,445,306 | B1 | * | 9/2002 | Trovato et al. ............... 725/38 |
| 6,727,914 | B1 | * | 4/2004 | Gutta ......................... 345/719 |
| 6,973,663 | B1 | * | 12/2005 | Brown et al. ................. 725/39 |

FOREIGN PATENT DOCUMENTS

EP          0 854 645          7/1998

OTHER PUBLICATIONS

"Multivariate Statistics: Concepts, Models, and Applications—Cluster Analysis", David W. Stockburger, Mar. 1998.*

* cited by examiner

| EPG ID | Program ID | Category ID | Sub-category ID | Title | EPG Channel | Day | Date | Start-Time | Exact Duration | Year Of Make |
|---|---|---|---|---|---|---|---|---|---|---|
| 1 | 1 | 16 | 564 | ferishitei (felicity) no seishun | Wow | Fri | 4/9/99 | 20:00 | 50 | 1999 |
| 2 | 2 | 16 | 564 | Suzuran | Nhk | Mon | 4/5/99 | 8:15 | 15 | 1999 |
| 3 | 3 | 16 | 217 | genroku ryoran | Nhk | Sun | 4/4/99 | 20:00 | 45 | 1999 |
| 4 | 4 | 16 | 564 | nichiyo gekijo/goddo nyu-su | Tbs | Sun | 4/11/99 | 21:00 | 54 | 1999 |
| 5 | 5 | 16 | 563 | abunai ho-kago | Asahi | Mon | 4/12/99 | 20:00 | 54 | 1999 |
| 6 | 6 | 16 | 564 | rippu suteikku (lip stick) | Fuji | Mon | 4/12/99 | 21:00 | 54 | 1999 |
| 7 | 7 | 16 | 519 | Romansu | Nihon | Mon | 4/12/99 | 22:00 | 84 | 1999 |
| 8 | 8 | 16 | 188 | furuhata ninzaburo | Fuji | Tue | 4/13/99 | 21:00 | 69 | 1999 |
| 9 | 9 | 16 | 001 | kizudarake no onna | Fuji | Tue | 4/13/99 | 22:15 | 54 | 1999 |
| 10 | 10 | 16 | 564 | happi ai to kando no monogatari | Tokyo | Wed | 4/14/99 | 20:00 | 54 | 1999 |
| 11 | 11 | 16 | 563 | Naomi | Fuji | Wed | 4/14/99 | 21:00 | 54 | 1999 |
| 12 | 12 | 16 | 564 | aka ga hashiru - to-gei seishun ki | Nhk | Wed | 4/7/99 | 22:00 | 45 | 1999 |
| 13 | 13 | 16 | 519 | semi daburu | Fuji | Wed | 4/14/99 | 22:00 | 54 | 1999 |
| 14 | 14 | 16 | 188 | Maiko san wa meitantei! | Asahi | Wed | 4/15/99 | 20:00 | 54 | 1999 |
| 15 | 15 | 16 | 519 | koi no kiseki | Asahi | Thu | 4/15/99 | 21:00 | 69 | 1999 |

Fig. 2

| Category_ID | Subcategory_ID | Start_Time | Day | EPG_channel | Year_of_make | Occurrence |
|---|---|---|---|---|---|---|
| 16 | -1 | -1 | -1 | -1 | -1 | 6 |
| 16 | 564 | -1 | -1 | -1 | 1999 | 3 |
| 16 | 564 | 2200 | -1 | -1 | 1999 | 2 |
| -1 | 564 | -1 | -1 | -1 | -1 | 8 |
| -1 | -1 | -1 | 5 | -1 | -1 | 2 |
| 50 | 564 | -1 | 2 | -1 | -1 | 10 |
| -1 | 564 | -1 | -1 | -1 | -1 | 2 |
| 50 | 564 | -1 | -1 | -1 | -1 | 5 |
| -1 | 564 | -1 | 4 | -1 | -1 | 2 |

Fig. 6

Procedure MAIN

Sub-routine UPDATE-CASE-FILE

Sub-routine
GEN-CASE-GPLIST

Sub-routine
GEN-CASE-GPLIST

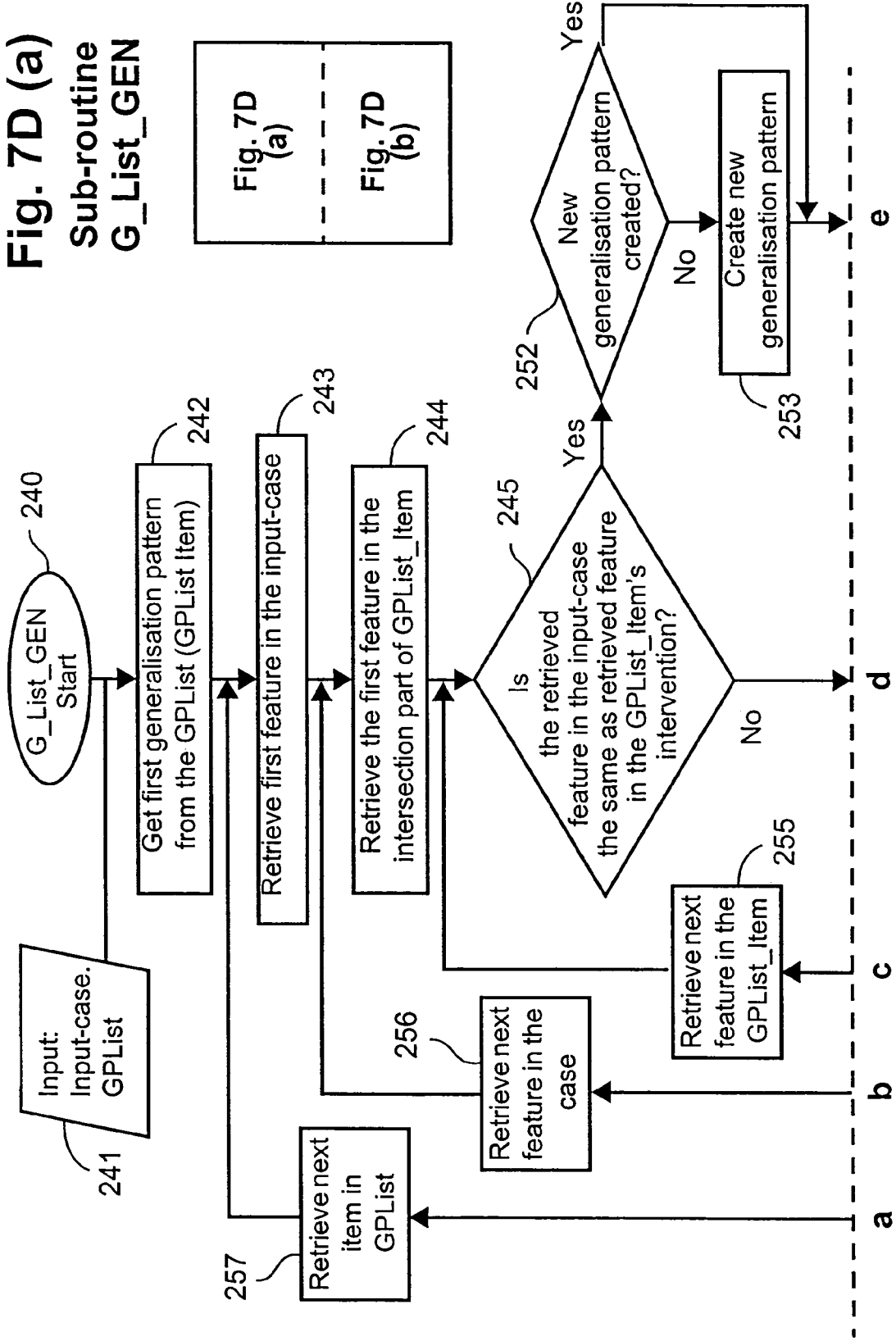
Fig. 7D (a) Sub-routine G_List_GEN

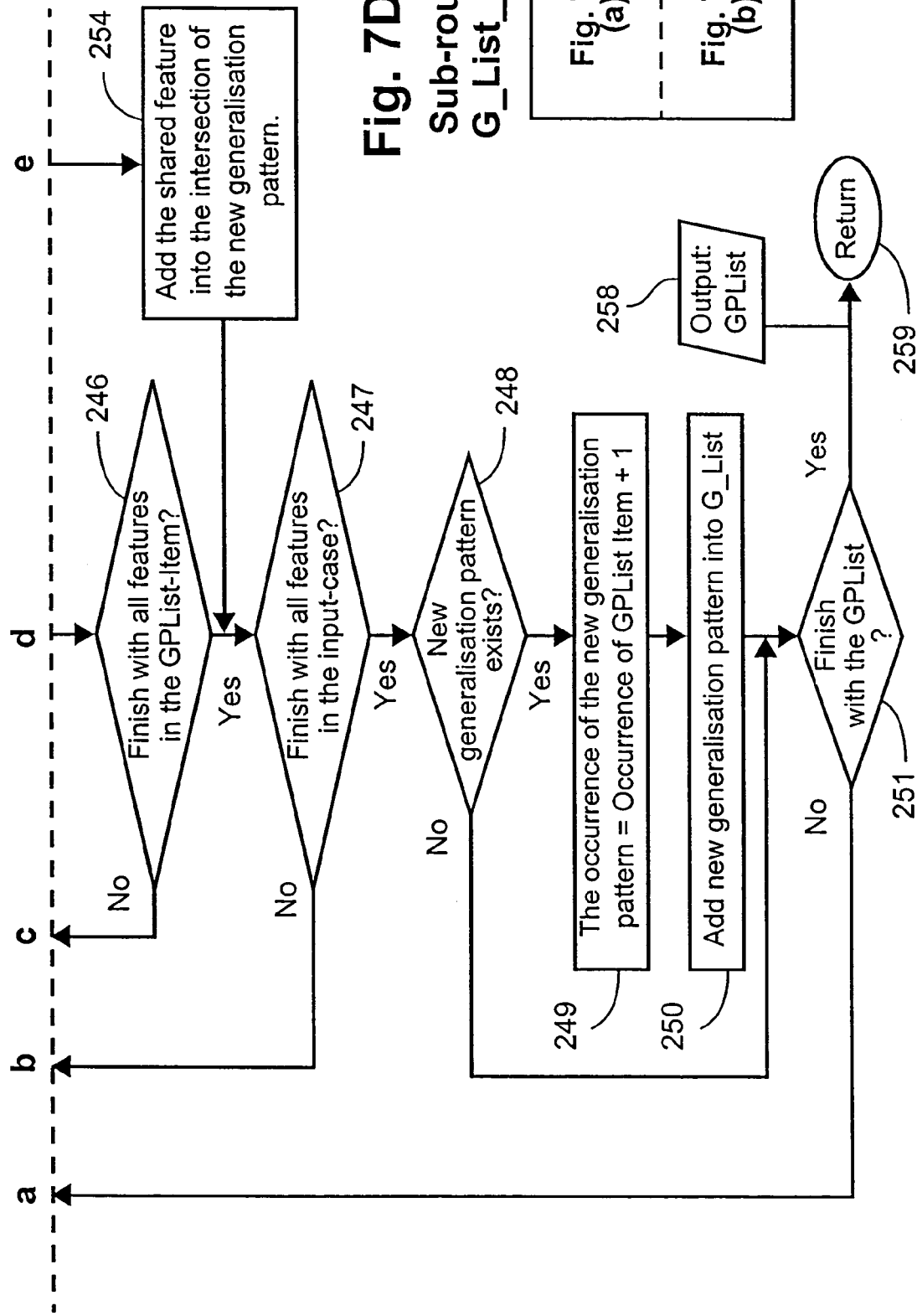

Sub-routine UG_List_GEN

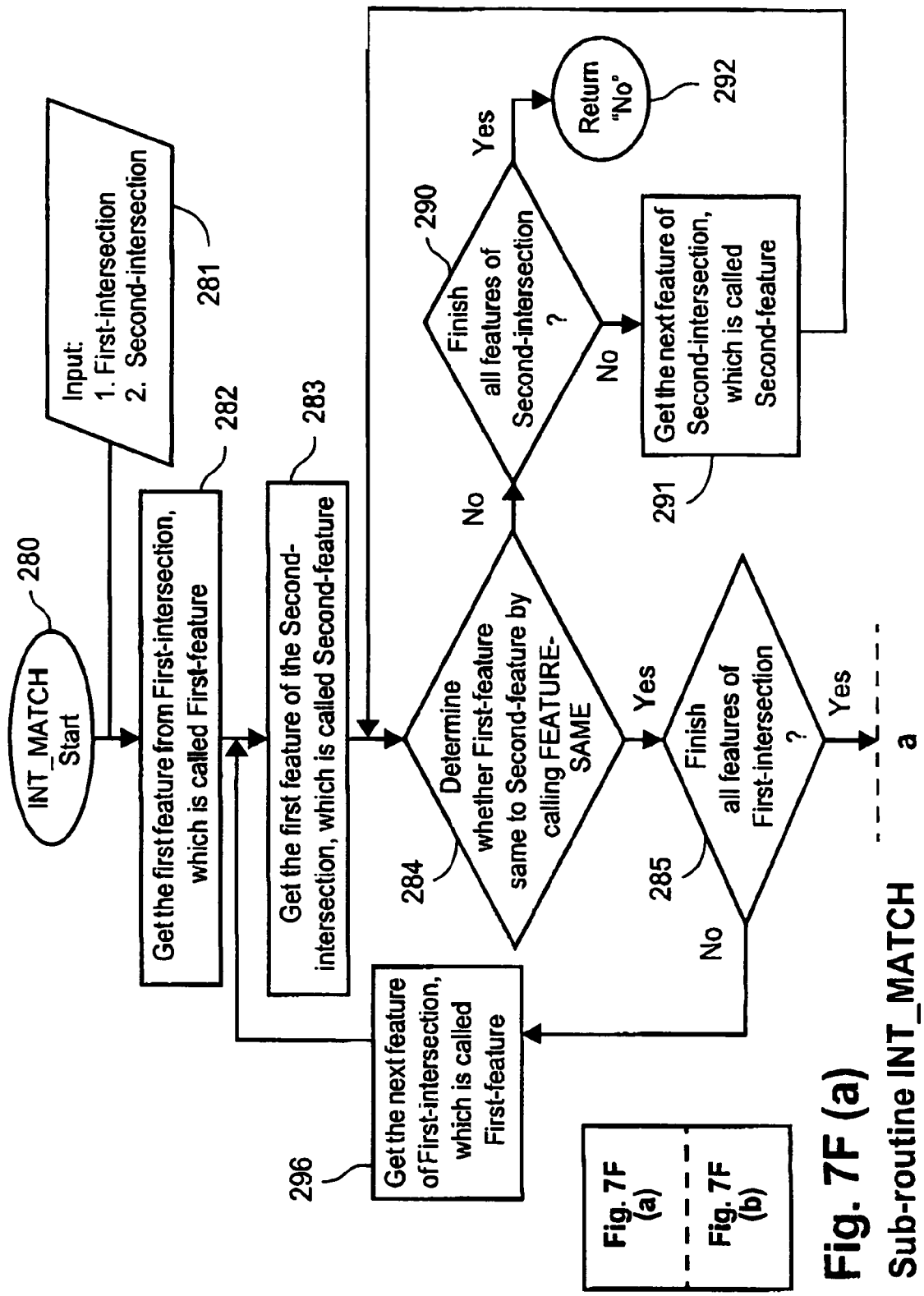
Fig. 7F (a) Sub-routine INT_MATCH

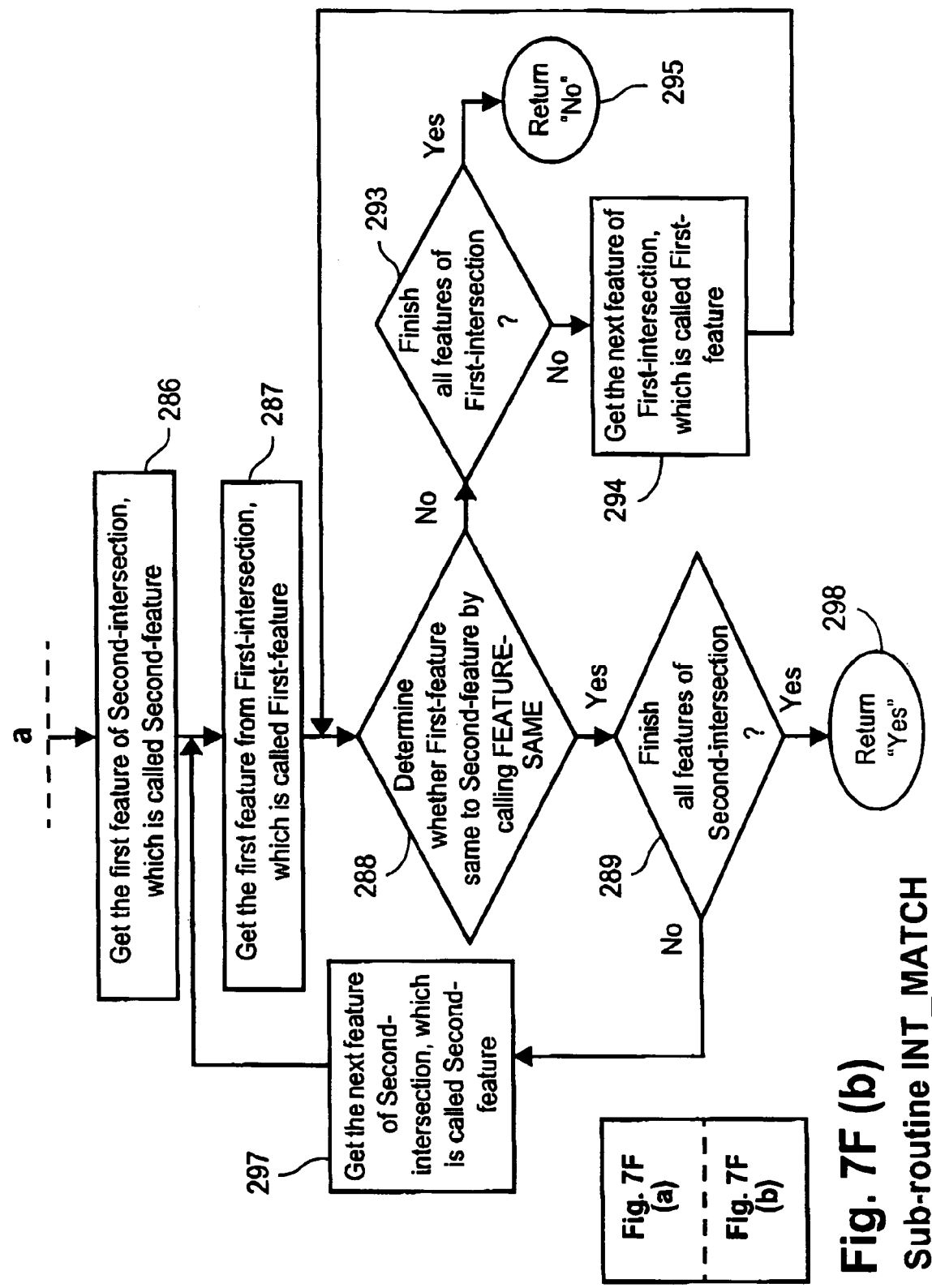
Fig. 7F (b) Sub-routine INT_MATCH

Sub-routine
FEATURE-SAME

Sub-routine GEN-CASE-EXAMINED-CASES

Sub-routine GET-GEN-PATTERN

Sub-routine IF-MATCH

Sub-routine IF-SAME

Sub-routine IF-SAME

Procedure RECOMMEND

Sub-routine REASON

Sub-routine BUILD_DYNAMIC_RULE

Sub-routine INTERPRET

Sub-routine PRODUCE

Routine ON_PROGRAM_SELECT

TELEVISION PROGRAM RECOMMENDATION SYSTEM

FIELD OF THE INVENTION

The present invention relates to television program selection and more particularly to a system for providing recommendations for television program selection.

DESCRIPTION OF BACKGROUND ART

Watching television is an everyday activity in a large number of households, and provides for a source of entertainment for a range of program content such as sport and movies, as well as news and actuality programs (eg. documentaries and lifestyle).

Traditionally, a viewer would consult a printed television schedule listing in a local newspaper or periodical to find a desirable program to watch. More recently, entertainment program guides have been made available in electronic form via the Internet or World Wide Web. However, with the introduction of satellite receivers for television and cable television, the number of television channels available to the viewer has increased dramatically. This has made the task of selecting a television program to watch using either printed program listings or on-screen Electronic Program Guides (EPG) very involved and time consuming.

Program listings that are ordered by characteristics including category, time or performers, can assist the viewer in making a selection, but such remains a time consuming task. Typically, there may only be a few programs of interest to the viewer out of the vast number of available programs.

Systems are available that monitor those categories of programs a viewer most frequently watches and to provide recommendations based on the most frequently watched category. Such arrangements suffer from the disadvantage of simply selecting a single program characteristic (such as category) from previously watched programs and making recommendations based on this selected program characteristic. However, selection by the viewer may depend on various characteristics and even combinations of characteristics. Furthermore, exactly how these characteristics and combinations of characteristics are joined for use in making the selection is highly individual for each user and prior art systems do not provide this level of flexibility.

DISCLOSURE OF THE INVENTION

It is an object of the present invention to substantially overcome, or at least ameliorate, one or more disadvantages of existing arrangements.

According to a first aspect of the invention, there is provided a method of enabling a selection of a program for viewing in a television system in which title information and characteristics of programs are made available as EPG (Electronic Program Guide) data including at least one program guide list, the method comprising the steps of:
  recording a plurality of characteristics associated with each program viewed by said user in the television system;
  forming sets of said characteristics, each said set comprising at least two of said characteristics; and
  associating at least each set with an ordered value representative of user's desire to view a particular program;
  wherein upon entry of a user request for a program recommendation, performing a search of the EPG data for programs with characteristics that best match said sets and notifying said user of an availability of programs that best match said sets as program recommendations.

According to another aspect of the invention there is provided a recommendation system for enabling a selection of a program for viewing in a television system in which title information and characteristics of programs are made available as EPG (Electronic Program Guide) data including at least one program guide list, the recommendation system comprising:
  memory means for recording a plurality of characteristics associated with each program viewed by said user in the television system;
  processing means for forming sets of said characteristics, each said set comprising at least two of said characteristics and for associating each said set with an ordered value representative of said user's desire to view a particular program;
  searching means for performing a search of the EPG data for programs with characteristics that best match said sets; and
  on-screen display means for notifying said user of an availability of programs that best match said sets as program recommendations upon entry of a user request for program recommendations.

According to yet another aspect of the invention there is provided a computer program product, having a computer readable medium, having a computer program recorded therein, for enabling a selection of a program for viewing in a television system in which title information and characteristics of programs are made available as EPG (Electronic Program Guide) data including at least one program guide list, the computer program product comprising:
  computer program code for recording a plurality of characteristics associated with each program viewed by said user in the television system;
  computer program code for forming sets of said characteristics, each said set comprising at least two of said characteristics; and
  computer program code for associating at least each set with an ordered value representative of user's desire to view a particular program;
  wherein upon entry of a user request for a program recommendation, computer program code for performing a search of the EPG data for programs with characteristics that best match said sets and notifying said user of an availability of programs that best match said sets as program recommendations.

According to yet another aspect of the invention there is provided a method of making recommendations to a user of programs for viewing in a television system wherein:
  information regarding programs is made available as EPG (Electronic Program Guide) data including at least one program guide list;
  a plurality of characteristics associated with each program previously viewed by said user, and each of a plurality of relationships and corresponding measures of acceptance of said user, with respect to program recommendations made in response to previous program requests, have been recorded;
  said method comprising the steps of:
  forming sets of said characteristics;
  selecting from said relationships at least one relationship, wherein at least one of said selected relationships comprises a highest one of said measures of acceptance;

ordering said sets of characteristics using said selected relationship to produce ordered sets of characteristics;

filtering said ordered sets of characteristics using said selected relationship to produce filtered sets of characteristics;

performing a search of the EPG data for programs with characteristics that best match said filtered sets of characteristics, giving preference to highest filtered sets of characteristics; and notifying said user of an availability of programs that best match said filtered sets as program recommendations upon entry of a user request for program recommendations.

According to yet another aspect of the invention there is provided a recommendation system for making recommendations to a user of programs for viewing in a television system in which information regarding programs is made available as EPG (Electronic Program Guide) data including at least one program guide list, the system comprising:

a first memory means for recording a plurality of characteristics associated with each program previously viewed by said user;

a second memory means for recording each of a plurality of relationships and corresponding measures of acceptance of said user, with respect to program recommendations made in response to previous program requests;

processing means for forming sets of said characteristics;

task selection means for selecting from said relationships at least one relationship, wherein at least one of said selected relationships comprises a highest one of said measures of acceptance;

ordering means for ordering said sets of characteristics using said selected relationship to produce ordered sets of characteristics;

filtering means for filtering said ordered sets of characteristics using said selected relationship to produce filtered sets of characteristics;

searching means performing a search of the EPG data for programs with characteristics that best match said filtered sets of characteristics, giving preference to highest filtered sets of characteristics; and on-screen display means for notifying said user of an availability of programs that best match said filtered sets as program recommendations upon entry of a user request for program recommendations.

According to yet another aspect of the invention there is provided a computer program product, having a computer readable medium, having a computer program recorded therein, for making recommendations to a user of programs for viewing in a television system wherein:

information regarding programs is made available as EPG (Electronic Program Guide) data including at least one program guide list;

a plurality of characteristics associated with each program previously viewed by said user, and each of a plurality of relationships and corresponding measures of acceptance of said user, with respect to program recommendations made in response to previous program requests, have been recorded;

said computer program product comprising:

code for forming sets of said characteristics;

code for selecting from said relationships at least one relationship, wherein at least one of said selected relationships comprises a highest one of said measures of acceptance;

code for ordering said sets of characteristics using said selected relationship to produce ordered sets of characteristics;

code for filtering said ordered sets of characteristics using said selected relationship to produce filtered sets of characteristics;

code for performing a search of the EPG data for programs with characteristics that best match said filtered sets of characteristics, giving preference to highest filtered sets of characteristics; and code for notifying said user of an availability of programs that best match said filtered sets as program recommendations upon entry of a user request for program recommendations.

BRIEF DESCRIPTION OF THE DRAWINGS

A preferred embodiment of the present invention will now be described with reference to the drawings, in which:

FIG. 2 is an extract from a typical Electronic Program Guide;

FIG. 6 is an example of a viewer profile database;

FIGS. 7A to 7K are flow diagrams of a method performed by a learning module of the avatar agent illustrated in FIG. 1A, to learn common features from selections made by the viewer;

DETAILED DESCRIPTION INCLUDING BEST MODE

Figure 1A:
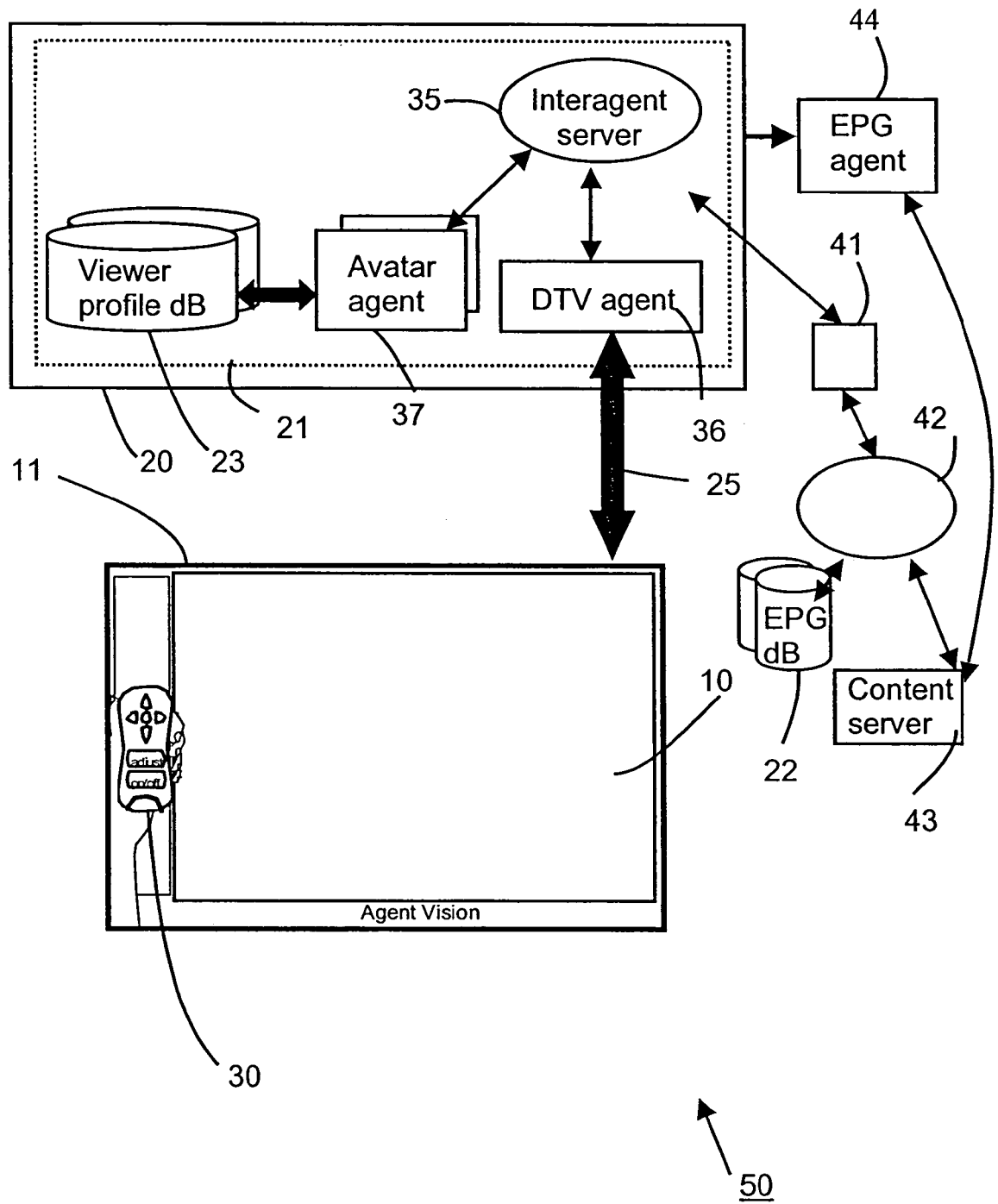
FIG. 1A is a schematic representation of a system.

FIG. 1A shows a system 50 for automatically suggesting suitable programs to a viewer from a large number of available programs. The system 50 comprises a digital television (DTV) 10 connected through interconnection 25 to a "set top" box 20. The "set top" box 20 is also connected through a gateway 41 to an external network 42. A number of content servers 43 and Electronic Program Guide (EPG) databases 22 are connected to the external network 42. The content servers 43 are typically provided by content providers and contain multimedia content including movies and television programs.

The available programs are listed in the EPG databases 22. Each of the content providers may maintain an associated EPG database 22. The available programs listed in the EPG databases 22 may be linked to the corresponding multimedia content in the content servers 43 by means of a program identifier. An extract from a typical EPG database 22 is shown in FIG. 2. The EPG database 22 has a number of program entries 60, each of which may include a number of attributes 61 with values 62. The attributes 61 may include:
- EPG ID which is a unique number per entry;
- Program ID which is unique for each program resulting in re-runs having the same Program ID;
- Category ID, for example '01' for art, '16' for drama, '50' for Movies and Series, '75' for sport etc.;
- Subcategory ID, for example, in the movies category '50', the subcategory '001' for action/adventure, '064' for comedy, '074' for crime etc;
- Title;
- Remarks, which is a general text field about the program entry;
- Keywords;
- Rating;
- EPG Channel;
- Start Day;
- Start Date;
- Start time;
- Duration; and
- Year of Make.

A DTV-agent system 21 is preferably formed within the "set top" box 20. In use, the viewer interacts with the DTV-agent system 21 using a remote control device 30. The DTV-agent system 21 may alternatively be integrated into the DTV 10 or incorporated into a personal computer 100 such as that seen in FIG. 10 and appropriately interfaced with the DTV 10.

In the preferred implementation, the DTV-agent system 21 includes a DTV-agent 36 for controlling the DTV 10, and a number of avatar-agents 37, each avatar-agent 37 representing a particular viewer. An Inter-agent-server (LAS) 35 manages all inter-agent communications and also interfaces with the gateway 41. The DTV-agent system 21 further includes a number of viewer profile databases 23 accessed by the avatar-agents 37. The functions of the DTV-agent 36 include:
- the provision of a graphical user interface via a display screen 11 of the DTV 10 by which recommendations are made to the viewer and to enable the viewer to make selection;
- to control the functionality of the DTV 10 including interacting with a television tuner module (not illustrated) thereof to select a channel for viewing from the plurality of available television channels; and
- to gather viewer selections and delivers them to the avatar agents 37.

Figure 1B:
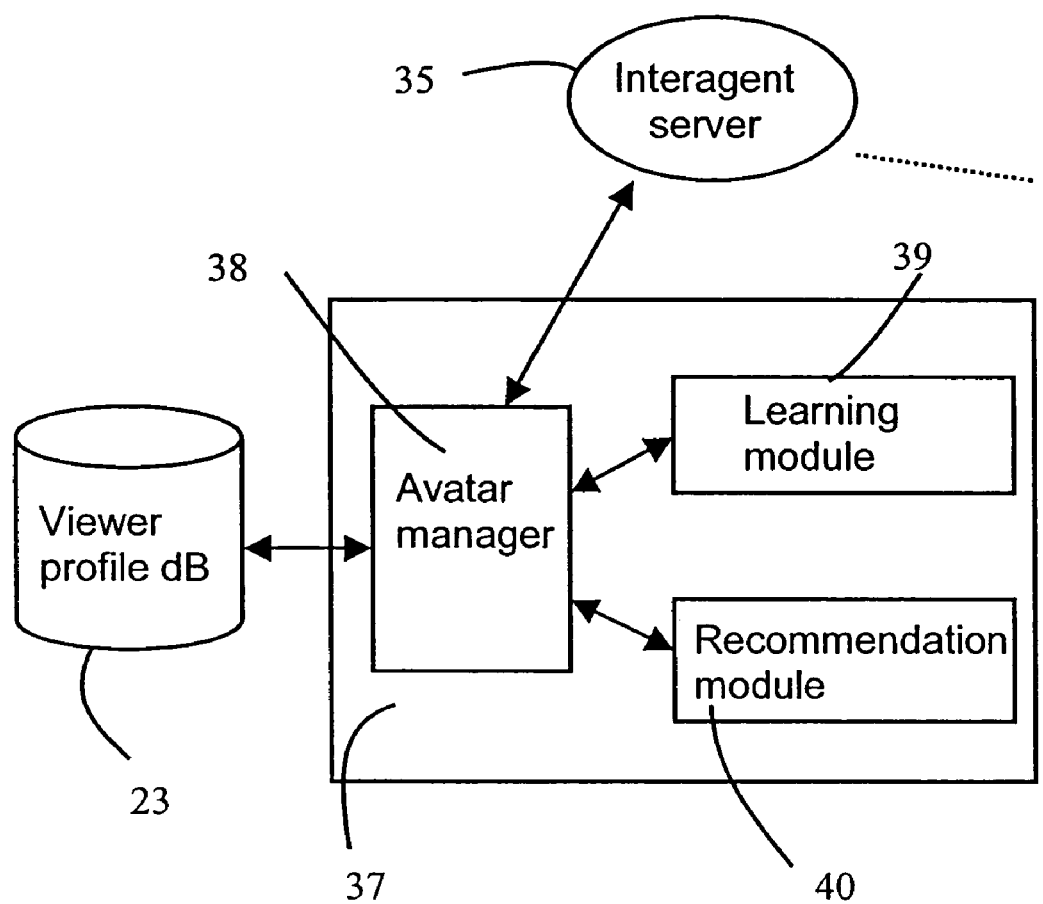
FIG. 1B is a detailed representation of an avatar agent of the system in FIG. 1A.

Each of the avatar-agents 37 is associated with a single viewer and a corresponding one of the viewer profile databases 23. As seen in FIG. 1B, each avatar-agent 37 includes an avatar manager 38 that maintains control of the particular avatar-agent 37. The avatar manager 38 accesses the EPG databases 22 through the LAS 35 to obtain television program information and the associated viewer profile database 23 to build and maintain the viewer profile. The avatar manager 38 is also responsible for sending messages to, and receiving messages from, the DTV-agent 36 through the LAS 35. Within the avatar-agent 37, the avatar manager 38 is also responsible for interfacing with each of a learning module 39 and a recommendation module 40. One task of the avatar-agent 37 is to build and maintain the viewer profile database 23 based on selections made by the viewer and processed by the learning module 39. The avatar-agent 37 then also uses the viewer profile database 23 to provide recommendations to the viewer by processing performed in the recommendation module 40. The recommendations are for the most suitable viewing options available for a specific viewer and are provided to the viewer via the display screen 11.

Referring again to FIG. 1A, the system 50 may further include an EPG agent 44 that interfaces with both the EPG databases 22 and the LAS 35. The EPG agent 44 accesses the EPG databases 22 and extract further attributes from the program entries 60, which includes Popularity, Urgency and Lifestyle. The Popularity attribute indicates whether a program entry 60 corresponds to a (currently) popular event/program, such as the Football World Cup or a concert by a popular performer. The Urgency attribute indicates whether a program entry 60 corresponds with an urgent program, such as special news/progress reports, weather announcements (tornado warnings, etc.), press conferences, nation addresses and so on. The Lifestyle attribute indicates that the program entry 60 corresponds to a certain type of lifestyle, such as Midday movies, 7 pm news, or Saturday night music shows. The values of these further attributes are True or False. In an alternative implementation, these attributes are already included in the EPG databases 22.

Referring to Tables 1 and 2, examples of typical steps for use of the system 50 will now be described.

TABLE 1

| Step | Message | From | To | Internal processing |
|---|---|---|---|---|
| 1# | | | | Viewer switches DTV 10 on. |
| 2 | | | | Animation characters 12 are displayed on the display screen 11. Viewer chooses animation character 12. |
| 3 | SetAnimationSelection | DTVA | AA | |
| 4# | SendUserData | AA | DTVA | |
| 5 | | | | Viewer interactively provides personal information and a viewing history based on prompts displayed on the display screen 11. |
| 6* | SetNewUserData | DTVA | AA | |
| 7# | | | | Viewer asks for recommendations 67. |
| 8 | | | | Prompt viewer for time and date. |
| 9* | SendRecommendationRequest | DTVA | AA | |
| 10# | SetRecommendations | AA | DTVA | |
| 11 | | | | EPG and preview data retrieved. |

TABLE 1-continued

| Step | Message | From | To | Internal processing |
| --- | --- | --- | --- | --- |
| 12 | | | | Preview data are displayed on display screen 11. Viewer makes a selection 68. |
| 13* | SetProgramSelection | DTVA | AA | |

Note: When the sequence shown in Table 1 reaches a star symbol (*), the DTV-agent 36 enters an "idle" mode, waiting for messages from avatar agent 37. In this mode, the DTV 10 displays a television program (on a channel most recently selected by the viewer). Sequence points indicated by a hash symbol (#) can be accessed at any time (i.e. asynchronously).

Figure 3:
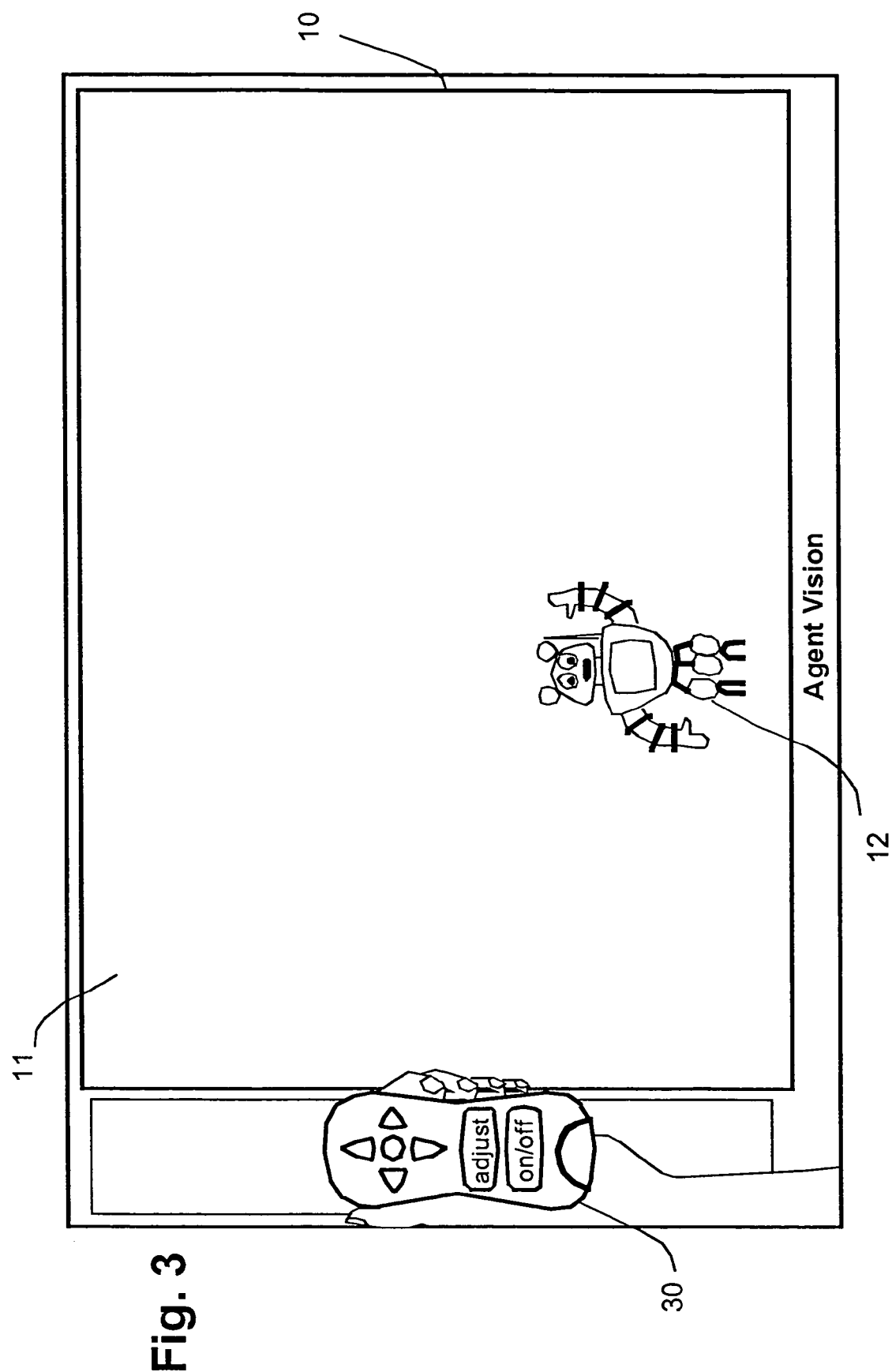
FIG. 3 is an illustration of an animated character displayed on a display screen of the system in FIG. 1A.

Table 1 illustrates a sequence of events and resulting messages to and from the DTV-agent 36 in which:

1. The user switches the DTV 10 'ON' using the remote control 30.
2. The viewer needs to identify himself/herself to the DTV-agent system 21. Referring to FIG. 3, this may be done by selecting an animation character 12 from a set of characters generated by the DTV-agent 36 and displayed on the display screen 11. The selection may be performed using the remote control 30. In the preferred implementation, there may be three types of characters:
   (i) Un-touched characters, meaning those that are not associated with any viewer;
   (ii) Dormant characters, meaning those that are associated with a viewer but that particular viewer is currently not engaged; and
   (iii) An active character 12, identifying that the associated viewer is presently selected. No active character will be present when the DTV 10 has just been turned 'ON'.
3. A SetAnimationSelection message is sent to the avatar agents 37, activating only the avatar-agent 37 associated with the identified viewer.
4. A SendUserData message is received from the avatar agent 37, instructing the DTV agent 36 to collect viewer data.
5. The DTV-agent 36 controls the display screen 11 of the DTV 10 for the collection of viewer data. The viewer provides the data using the remote control 30. The first time that a character 12 is selected, the system 50 assumes that it is a new viewer using the system 50 and therefore an unregistered viewer. The avatar agent 37 has no viewer profile database for the currently unregistered viewer.

Figure 4:
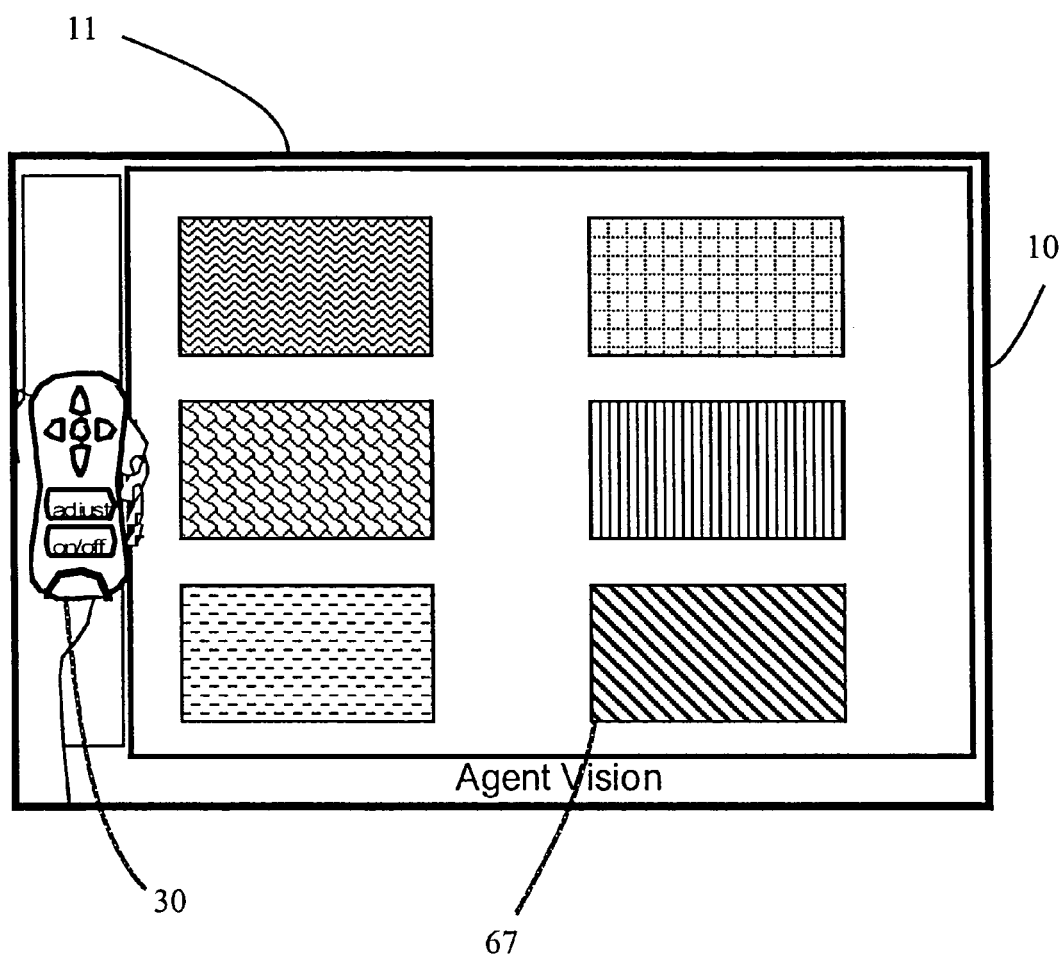
FIG. 4 is an example of how recommendations may be presented to a viewer by the system in FIG. 1A.
Figure 5:
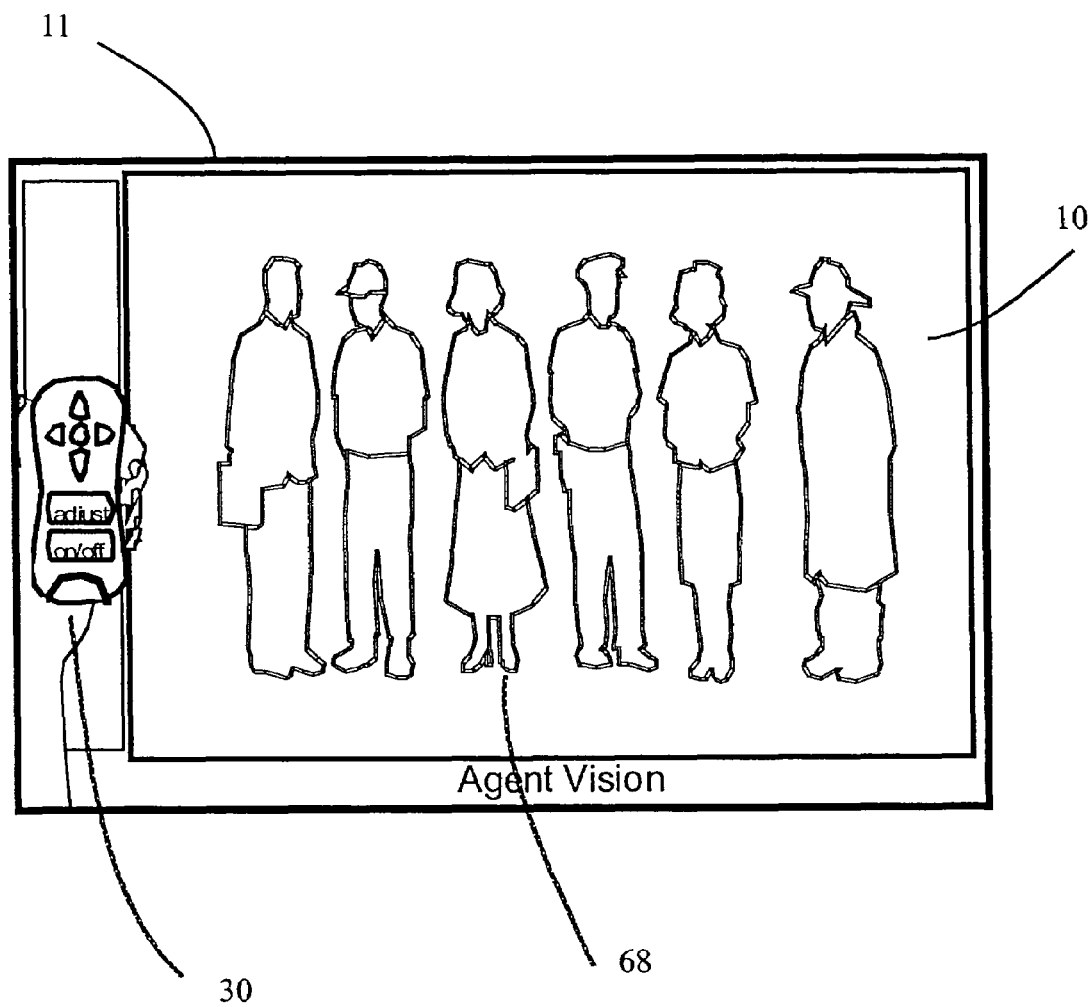
FIG. 5 is an example of a selection made from the recommendations in FIG. 4.

The viewer may then be requested by the DTV-agent 36 to select one of a number of moods currently being experienced, again by making a selection with the remote control 30. Examples of such moods include happy, sad, neutral etc. A password may also be requested from the viewer when the program content is password-protected (eg. adult content).
6. The viewer data are formatted and sent in a SetNewUserData message to the avatar-agent 37. The DTV agent 36 enters into the idle mode.
7. The viewer uses the remote control 30 to request from the DTV-agent system 21 a list of recommended television programs.
8. The DTV-agent 36 prompts the viewer for a time and date for which recommendations should be provided. Alternatively, recommendations may automatically be for television programs due to start in the following predetermined number of minutes.
9. The time and date are formatted and sent to the avatar-agent 37 in a SendRecommendationRequest message. The DTV agent 36 enters into the idle mode.
10. The avatar agent 37, and in particular the recommendation module 40, determines viewing recommendations for viewing from the EPG databases 22 that best match the viewer's preferences for the given timeslot and the viewer mood. The avatar agent 37 sends these viewing recommendations in a SetRecommendations message to the DTV agent 36.
11. Based on the recommended programs received from the avatar agent 37, data are retrieved from the EPG databases 22 and one or more preview databases (not shown). The preview databases may form part of the EPG databases 22 or alternatively, the content servers 43 and provide a brief example or preview of the content of a particular program.
12. The DTV-agent 36 formats the viewing recommendations and displays the recommendations on the display screen 11. As illustrated in FIG. 4, the viewing recommendations 67 are preferably provided to the viewer on the display screen 11 by displaying a set of previews. Alternatively, a bitmap image or a title only is displayed on the display screen 11, each of which representing a viewing recommendation 67. Additional information may also be displayed associated with each of the recommendations 67. The viewing recommendations 67 may also be displayed in a manner to reflect the program attributes. For example, all the viewing recommendations 67 having a common category may be displayed together. The viewer views the viewing recommendations 67 and selects one of the viewing recommendations 67 using the remote control 30. The DTV-agent 36 interacts with the DTV 10, which responds by tuning into a receiver channel on which the selected program is broadcast. The selected program 68 is then displayed on the full display screen 11 as shown in FIG. 5.
13. Information about the selected program 68 is sent to the avatar agent 37 in a SetProgramSelection message. The DTV-agent 36 enters its idle mode while the selected program 68 is displayed on the display screen 11.

Table 2 illustrates a sequence of events and resulting messages to and from the avatar-agents 37 in which:

1. A SetAnimationSelection message is received from the DTV-agent 36 by the avatar-agent 37 associated with the selected animation character 12. The other avatar-agents 37 remain in the idle mode.
2. The avatar agent 37 determines whether the selected character 12 corresponds to a viewer known to the DTV-agent system 21, or to a new viewer. If the viewer is not known to the DTV-agent system 21, the next sequence step is step 3. Otherwise the avatar manager 38 enters its idle mode.

12. A SetRecommendations message, containing a list of recommended programs 67 is sent to the DTV agent 36. The avatar manager 38 enters its idle mode.

TABLE 2

| Step | Message | From | To | Internal processing |
|---|---|---|---|---|
| 1# | SetAnimationSelection | DTVA | AA | |
| 2* | | | | Retrieve information from viewer profile database 23 to establish whether the viewer has profile data. If not, go to step 3. |
| 3 | | | | Create viewer profile database 23. |
| 4 | SendViewerData | AA | DTVA | |
| 5 | SetNewViewerData | DTVA | AA | |
| 6* | | | | Update viewer profile database 23. |
| 7# | SendRecommendationRequeat | DTVA | AA | |
| 8 | | | | Retrieve viewer profile and EPG information from databases 23 and 22. |
| 9 | | | | Send viewer data and television program information to recommendation module 40. |
| 10 | | | | Recommendation module 40 constructs a list of recommended television programs 67. |
| 11 | | | | Receive program recommendations 67 from recommendation module 40. |
| 12* | SetRecommendations | AA | DTVA | |
| 13# | SetProgramSelection | DTVA | AA | |
| 14 | | | | Retrieve viewer profile and program data from databases 23 and 22. |
| 15 | | | | Send viewer data and new program data to learning module 39. |
| 16 | | | | The learning module 39 updates the Case-file. |
| 17 | | | | Receive Case-file from learning module 39. |
| 18* | | | | Update viewer profile database 23. |

Note: When the sequence shown in Table 1 reaches a *, the avatar-agent 37 enters an "idle" mode, waiting for messages from DTV-agent 36. In this mode, background processing by the learning module 39 and recommendation module 40 may occur. Sequence points indicated by a hash symbol (#) can be accessed at any time (i.e. asynchronously).

3. A profile for the new viewer is created in the viewer profile database 23.
4. A SendViewerData message is sent to the DTV agent 36.
5. A SetNewViewerData message is received from the DTV agent 36. This contains static viewer attributes.
6. The avatar manager 38 stores the viewer attributes in the viewer profile database 23. The avatar manager 38 enters its idle mode.
7. A SendRecommendationRequest message is received from the DTV agent 36. The viewer has requested that viewer recommendations 67 for a particular day and time be provided. Alternatively, recommendations may automatically be for television programs due to start in the following predetermined number of minutes.
8. The avatar-manager 38 retrieve viewer profile data from viewer profile database 23 and retrieve television program information from the EPG databases 22. The data is formatted for use by recommendation module 40.
9. The viewer profile data and the program information are sent to the recommendation module 40 by the avatar manager 38. Alternatively, the recommendation module 40 retrieves the data directly.
10 The recommendation module 40 constructs a list of programs 67 to be recommended to the viewer.
11. The list of recommended programs 67 is sent from the recommendation module 40 to the avatar manager 38.
13. A SetProgramSelection is received from the DTV agent 36, indicating that the viewer has selected a particular program 68.
14. The program entry 60 about the selected program 68 is retrieved from the EPG database 22. The viewer profile is also retrieved from the viewer profile database 23.
15. The selected program information is sent to the learning module 39 for updating of a Case-file.
16. The learning module 39 updates the Case-file to take account of the selected program 68.
17. The updated Case-file is received by the avatar manager 38 from the learning module 39.
18. The updated Case-file is used to update the viewer profile database 23. The avatar manager 38 enters its idle mode.

The operations within the learning module 39 will now be described in more detail. Each program is associated with a number of features (fi), each feature representing a unique attribute and attribute value pair. The attributes may include the program attributes 61 from the EPG database 22 (illustrated in FIG. 2) as well as viewer attributes when the selection was made. The viewer attributes may include for example the mood of the viewer. Each attribute has a number of possible values. An example of an attribute-value pair is Category='drama' where Category is the attribute and 'drama' is the attribute value.

Each selection 68 made by the viewer is termed a case (Cj), and is defined by a set of features (fi). For example, a case may be (Category='drama', Sub-category='comedy-drama', . . . , EPG channel='Nbk', . . . ). The cases (Cj) may have different number of features (fi), dependent on the information available. All cases are stored in the viewer profile database 23 in a case file for use by the learning module 39.

The learning module 39 operates to identify shared or generalisation patterns of features (fi) from a number of cases (Cj) from the case file. The learning module 39 takes the case file as input and generates a Generalisation Pattern List (GPList), stored also in the viewer profile database 23. The GPlist contains all generalisation patterns from the case file. Each generalisation pattern in the OPList may be represented as follows:

([intersection], occurrence), wherein intersection indicates a set of the features (fi) that are shared by different cases (Cj). Occurrence indicates the number of cases that share such an intersection. For example, from the following cases:

C1=(f1, f2, f3, f4, f7);
C2=(f1, f2, f5, f6, f7); and
C3=(f3, f5, f6, f8)

the GPList generated from the three cases has three items:

([f1, f2, f7], 2);
([f3], 2); and
([f5, f6], 2)

The first GPList entry above arises from the features f1, f2 and f7 occurring both in cases C1 and C2. The other entries are derived in a similar manner.

Each time new cases (Cj) become available through selections by the viewer of programs to watch, those new cases are added to the case file and a new GPList is generated by the learning module 39. Assume for example that the case file contains the following three cases:

C1=(Category='drama', Sub-category='comedy-drama', EPG channel='Nhk');
C2=(Category='drama', Sub-category='war', EPG channel='Nhk', StartTime='21:00'); and
C3=(Category='sports', EPG channel='Wow', StartTime='8:15', Day='Sat').

The GPList generated by the learning module would only include:

([Category='drama', EPG channel='Nhk'], 2)

When new viewer selections 68, and therefore further cases, became available, for example C4=(Category='drama', Sub-category='Talk', EPG channel='Nhk'); and
C5=(Category='sports', Sub-category='Current affairs', StartTime='10:00', Day='set') cases C4 and C5 are added to the case file and the GPList is recalculated by the learning module 39 to contain the following entries:
([Category='drama', EPG channel='Nbk'], 3)
([Category='sports', Day='Sat'], 2)

Figure 7A:
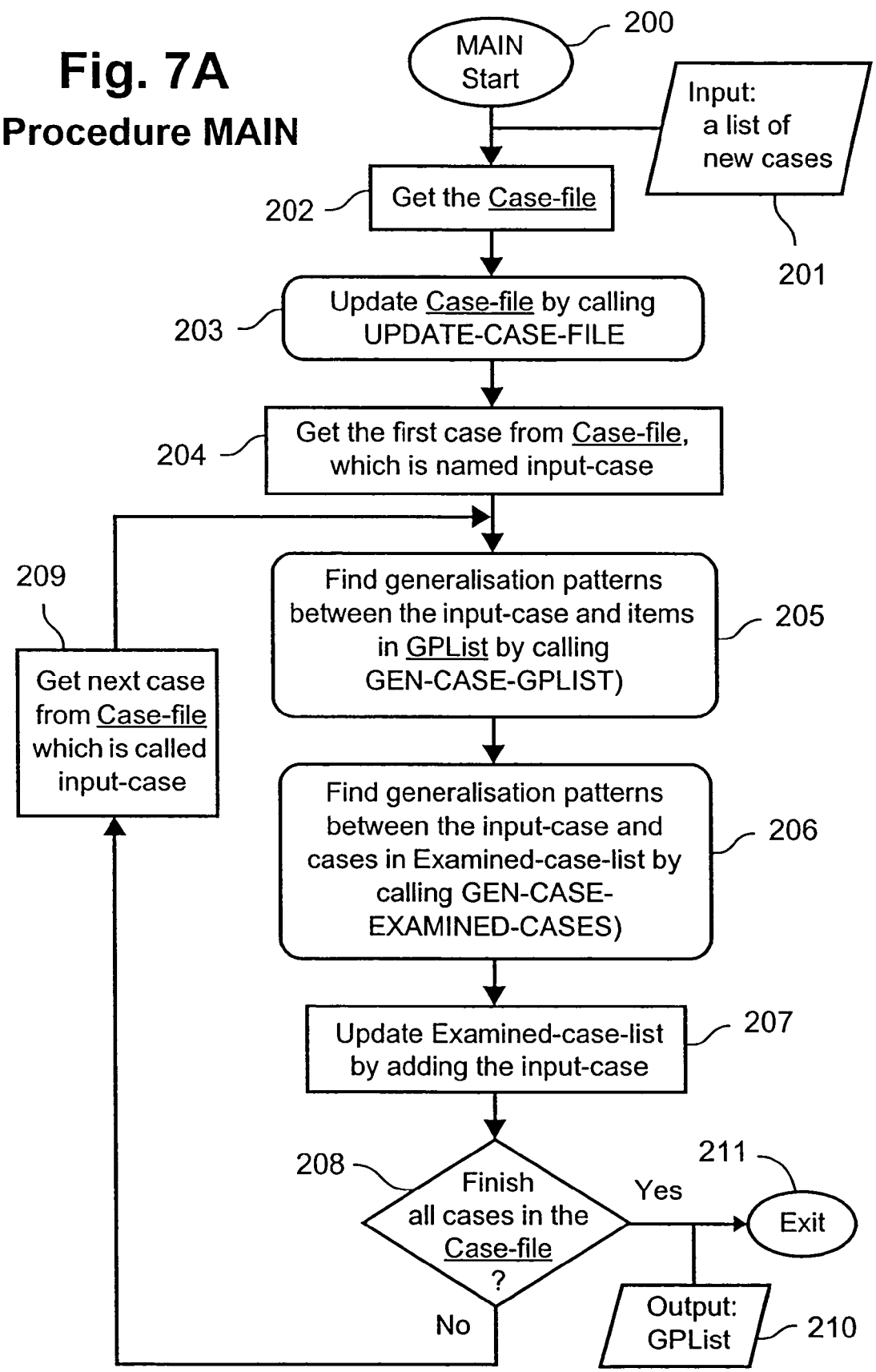

A procedure MAIN for performing the core function in the learning module 39 is shown in FIG. 7A. Three data structures are used in the procedure namely, the Case-file which contains a number of cases (Cj), the GPList which keeps all generalisation patterns, and an Examined-case-list which contains cases that are already processed. Initially, upon initiation of the procedure MAIN when a viewer requested for recommendations, the GPList and the Examined-case-list are empty.

The procedure MAIN starts in step 200 by first obtaining a list of new cases in step 201 and the Case-file from the viewer profile database in step 202. A sub-routine UPDATE-CASE-FILE is called in step 203 for updating the Case-file by adding the new cases. The sub-routine UPDATE-CASE-FILE starts at step 212 in FIG. 7B.

Intersections for each case of the Case-file with the current GPList is obtained in the remaining steps 204 to 211. A first entry from the Case-file is taken in step 204 and used as an input case when calling sub-routine GEN-CASE-GPList in step 205. Sub-routine GEN-CASE-GPList finds the generalization patterns between the input-case and items in the GPList and starts at step 220 in FIG. 7C. Sub-routing GEN-CASE-EXAMINED-CASES is called in step 206 for finding generalization patterns between the input-case and the cases in the Examined-case-list. Sub-routing GEN-CASE-EXAMINED-CASES starts at step 310 in FIG. 7H. In step 207, the input-case is added to the Examined-case-list. Cases (Cj) are therefore progressively moved from the Case-file to the Examined-case-list until the Case-file is empty. Step 208 determines whether Case-file has any more entries. If there are any remaining entries in the Case-file, the procedure MAIN proceeds to step 209 where the next entry from Case-file is used as input-case and the procedure MAIN continues to step 205.

After step 208 determines that the Case-file is empty, the procedure MAIN produce generalization patterns in the GPList as an output in step 210 and ends in step 211.

Figure 7B:
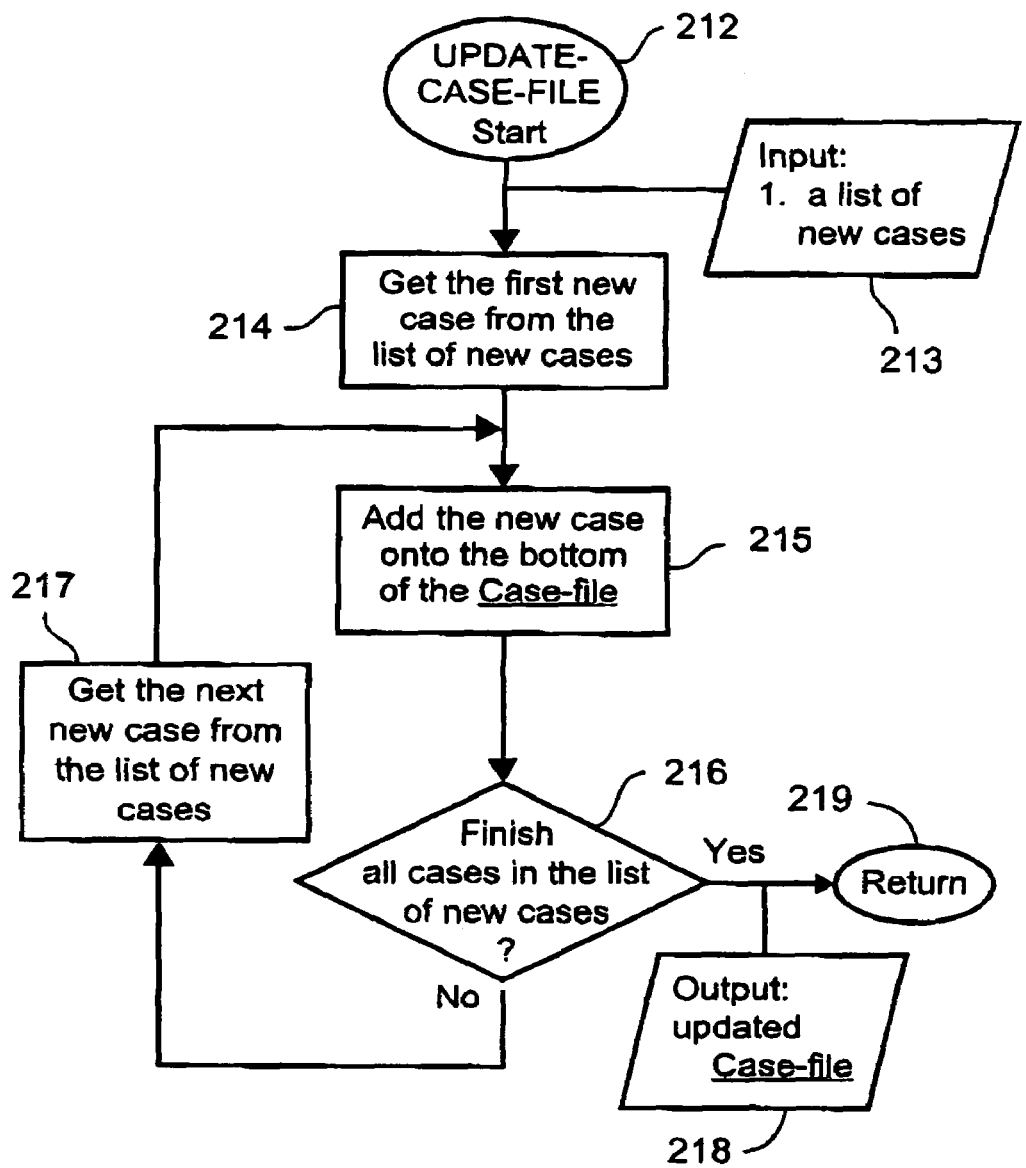

Referring now to FIG. 7B wherein the sub-routine UPDATE-CASE-FILE is shown. This sub-routine includes the new cases produced as input in step 201 in procedure MAIN and into them into the current Case-file. It receives the entries from the list of new cases in step 213 and taking a next new case from the list of new cases in step 214, the next new case is added onto the end of the Case-file. Step 216 determines whether all the new cases has been dealt with and proceeds to steps 217 and 215 where the next entry is added to the Case-file. An updated Case-file is produced as output in step 218 and the sub-routine UPDATE-CASE-FILE ends in step 219.

Figure 7C:
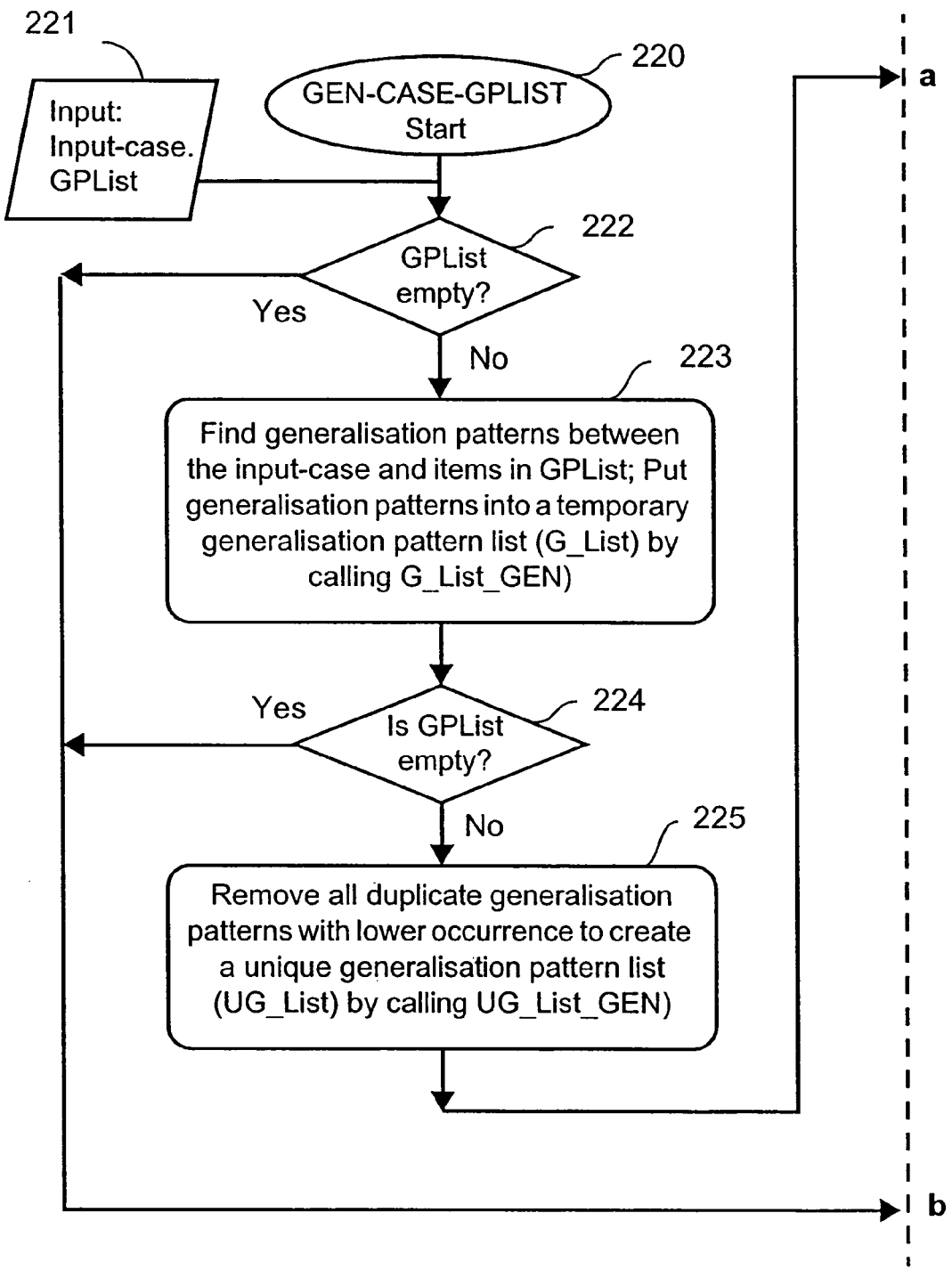
Figure 7C:
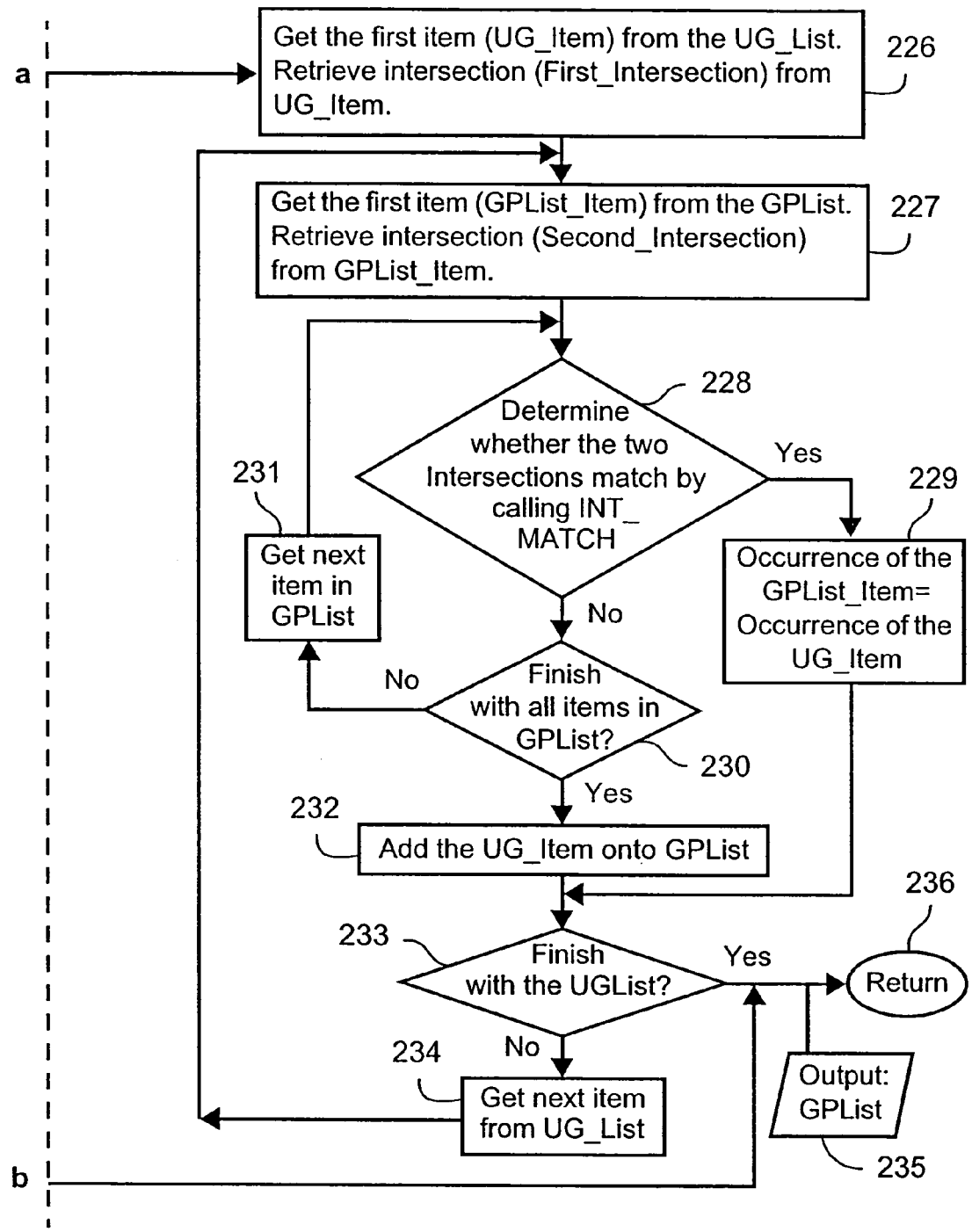

Referring to FIG. 7C, the sub-routine GEN-CASE-GPLIST is to find all generalization patterns between the input-case and all items in the GPList. It further updates the GPList with all new generalization patterns between the input-case and the current GPList.

GEN-CASE-GPLIST starts in step 220 and receives the input case and the current GPList as inputs in step 221. It is determined in step 222 whether the current GPList is still empty. If the current GPList is empty, then no generalization patterns between the input-case and the GPList can exist and the sub-routine returns in step 236.

With items in the GPList, the sub-routine continues to step 223 wherein all generalization patterns between the input-case and all items in the GPList are found by calling sub-routine G_List_GEN. The generalization patterns are put in a G_List, which contains potential generalization patterns between the input-case and the GPList. The sub-routine G_List_GEN starts at step 240 in FIG. 7D.

It is determined in step 224 whether the G_List is empty. If the G_List is empty, then no generalization patterns between the input-case and the GPList was found by sub-routine G_List_GEN and the sub-routine GEN-CASE-GPLIST returns in step 236.

With items in the G_List, the sub-routine GEN-CASE-GPLIST continues to step 225 where subroutine UG_List_GEN is called. Subroutine UG_List_GEN starts at step 260 in FIG. 7E, and forms a unique generalisation pattern list, UG_List, from the G_List.

A first item from the UG_List, UG_Item, is retrieved and the intersection, First_Intersection, from the UG_Item is extracted in step 226. A first item from the GPList, GPList_Item, is retrieved and the intersection, Second_Intersection, from the GPList_Item is extracted in step 227.

Step 228 calls sub-routine INT_MATCH to determine whether First_Intersection and Second_Intersection match. Sub-routine INT_MATCH starts at step 280 in FIG. 7F. If step 228 finds that First_Intersection and Second_Intersection match, the occurrence of GPList_Item is made equal to that of UG_Item in step 229. The sub-routine continues to step 233.

If step 228 finds that First_Intersection and Second_Intersection do not match, then step 230 determines whether all items of the GPList have been considered. If items remain, the next item in the GPList is retrieved with it's intersection as Second_Intersection in step 231, before step 228 again determines whether First_Intersection and Second_Intersection match. If step 230 determined that all items in the GPList have been considered, then the UG_Item is added to the GPList in step 232 and the sub-routine continues to step 233.

If step 233 determines that all items in the UG_List have not been considered, then the next item in the UG_List is retrieved with it's intersection as First_Intersection in step 234 and followed by step 227. Alternatively, if step 233 determines that all items in the UG_List have been considered, the sub-routine GEN-CASE-GPLIST outputs the GPList in step 235 and returns in step 236.

Referring to FIG. 7D, sub-routine G_List_GEN is described, which determines all generalisation patterns between the input-case with all items in the GPList. Starting at step 240, it receives as inputs the input-case and the GPList. The inputs are obtained in step 241. A first generalisation pattern, GPList_Item is obtained from the GPList in step 242, a first feature from the input case in retrieved in step 243 and a first feature from the intersection part of the GPList_Item is retrieved in step 244. Step 245 determines whether the retrieved feature from the input-case is the same as the retrieved feature from the GPList_Item. If no match is found in step 245, step 246 determines whether all features from the GPList_Item has been dealt with. With more features in the GPList_Item remaining, step 255 retrieves a next feature from the GPList_Item and continues to step 245. If all the features in the GPList_Item were considered, the sub-routine continues to step 247.

If step 245 responds in the affirmative, step 252 determines whether a new generalization pattern has been created and create one in step 253 if required, or if it was already done, proceeds to step 254, where the shared feature is added to the new generalization pattern. The sub-routine continues to step 247 where it is determined whether all features from the input-case have been dealt with. If there are remaining features in the input-case, step 256 retrieves the next feature from the input-case.

If step 247 determined that all the features from the input-case were considered, step 248 determines whether a new generalisation pattern was created in step 252. If the generalisation pattern already existed in the intersection parts of the GPList, the sub-routine continues to step 249 where the occurrence of the new generalisation pattern is given a value of the GPList Item that has the same intersection plus 1. In step 250 the new generalisation pattern is added to the G_List.

If step 248 determined that the new generalisation pattern does not already exist in the GPList, then the sub-routine continues to step 251.

Step 251 determines whether all items from the GPList have been considered. If an item remains in the GPList, the sub-routine continues to step 257 where the next item in the GPList is retrieved and step 243 is executed. Alternatively, with all items in the GPList considered, the sub-routine G_List_GEN returns in step 259 after producing the new G_List as output in step 258.

Figure 7E:
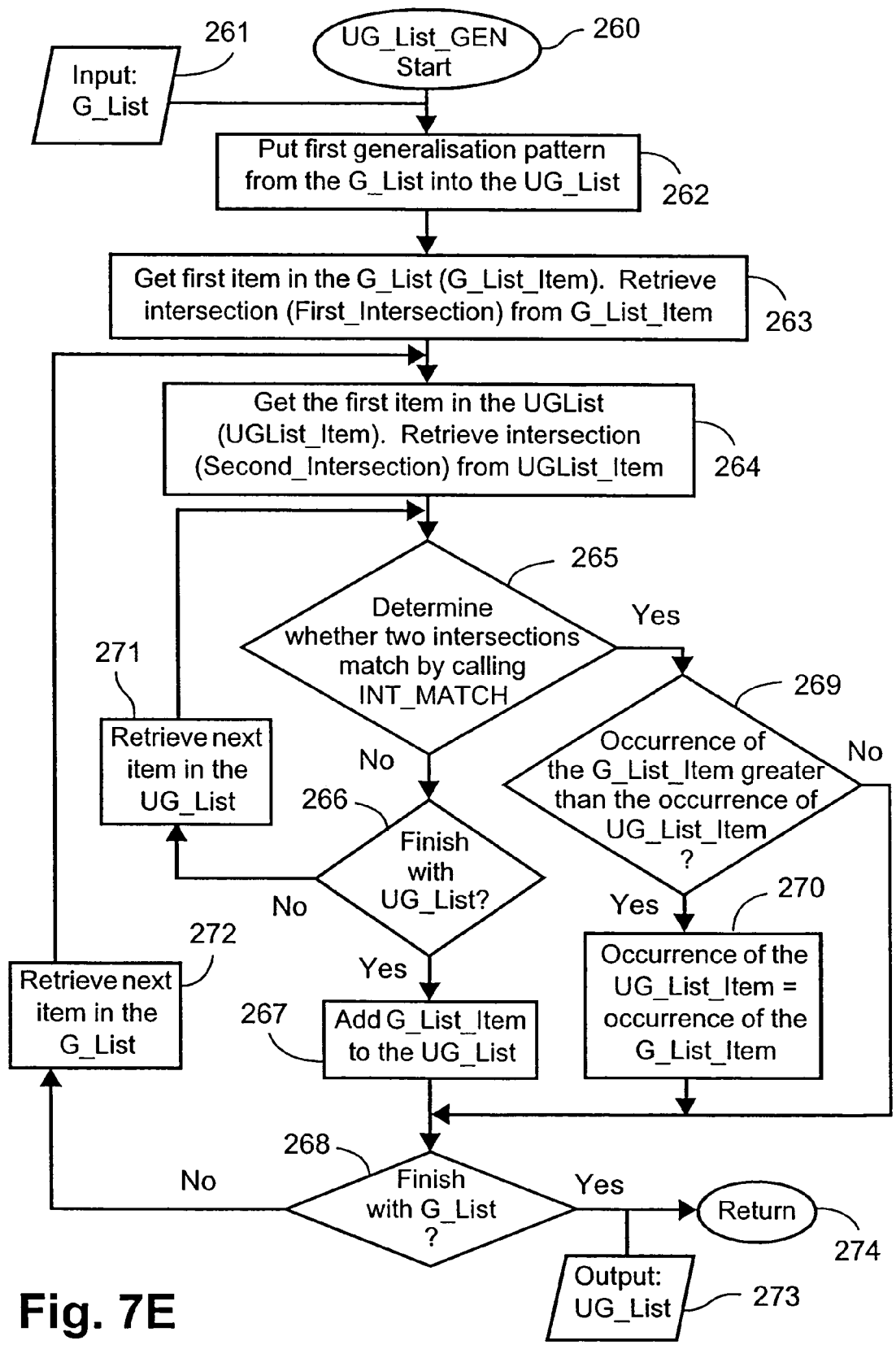

Referring to FIG. 7E, a sub-routine UG_List_GEN is shown that procedure forms a unique generalisation pattern list, UG_List. Starting in step 260, the sub-routine receives in step 261 the G_List as input. In step 262 the first generalisation pattern is copied from the G_List into the UG_List. A first item from the G_List, G_List_Item, is retrieved and the intersection, First_Intersection, from the G_List_Item is retrieved in step 263. A first item from the UGList, UGList_Item, is retrieved and the intersection, Second_Intersection, from the UGList_Item is retrieved in step 264.

Step 265 calls sub-routine INT_MATCH to determine whether First_Intersection and Second_Intersection match. Sub-routine INT_MATCH starts at step 280 in FIG. 7F. If First_Intersection and Second_Intersection match, the higher occurrence of the two items, G_List_Item and UG_List_Item, is determined and saved as the occurrence of UG_List_Item in steps 269 and 270. The sub-routine continues to step 268.

If First_Intersection and Second_Intersection do not match, step 266 determines whether all items of the UG_List have been considered. If items remain, the next item in the UG_List is retrieved with its intersection as Second_Intersection in step 271, before step 265 again determines whether First_Intersection and Second_Intersection match. If step 266 determined that all items in the UG_List have been considered, then the G_List_Item is added to the UG_List in step 267 and the sub-routine continues to step 268.

If step 268 determines that all items in the G_List have not been considered, then the next item in the G_List is retrieved with it's intersection as First_Intersection in step 272 and followed by step 264. Alternatively, if step 268 determines that all items in the G_List have been considered, the sub-routine UG_LIST_GEN outputs the UG_List in step 273 and returns in step 274.

Referring to FIG. 7F, subroutine INT_MATCH is shown which check whether the First_Intersection and the Second_Intersection, obtained as inputs in step 281, are the same. Step 282 retrieves the first feature from First_Intersection, named First-feature, followed by step 283 where the first feature from Second_Intersection, named Second-feature, is retrieved. Step 284 calls sub-routine FEATURE-SAME to determine whether First-feature is the same as Second-feature. Sub-routine FEATURE-SAME starts at step 300 in FIG. 7G. If they are the same, then step 285 determines whether all the features of First_Intersection have been considered. If this is affirmative, then the sub-routine continues to step 286. If not, then step 296 retrieves the next feature from First_Intersection, names it First-feature and continues to step 283. However, if step 284 determined that First-feature is not the same as Second-feature, then step 290 determines whether all the features of the Second_Intersection have been considered. If this is affirmative, then the sub-routine INT_MATCH returns a "NO" in step 292. If features of the Second_Intersection remain, then step 291 retrieves the next feature from Second_Intersection, names it Second-feature and continues to step 284.

Step 286 retrieves the first feature from Second_Intersection, named Second-feature, followed by step 287 where the first feature from First_Intersection, named First-feature, is retrieved. Step 288 calls sub-routine FEATURE-SAME to determine whether First-feature is the same as Second-feature. If they are the same, then step 289 determines whether all the features of Second_Intersection have been considered. If this is affirmative, then the sub-routine INT_MATCH returns a "YES" in step 298. If not, then step 297 retrieves the next feature from Second_Intersection, names it Second-feature and continues to step 287. However, if step 288 determined that First-feature is not the same as Second-feature, then step 293 determines whether all the features of the First_Intersection have been considered. If this is affirmative, then the sub-routine INT_MATCH returns a "NO" in step 295. If features of the First_Intersection remain, then step 294 retrieves the next feature from First_Intersection, names it First-feature and continues to step 288.

Figure 7G:
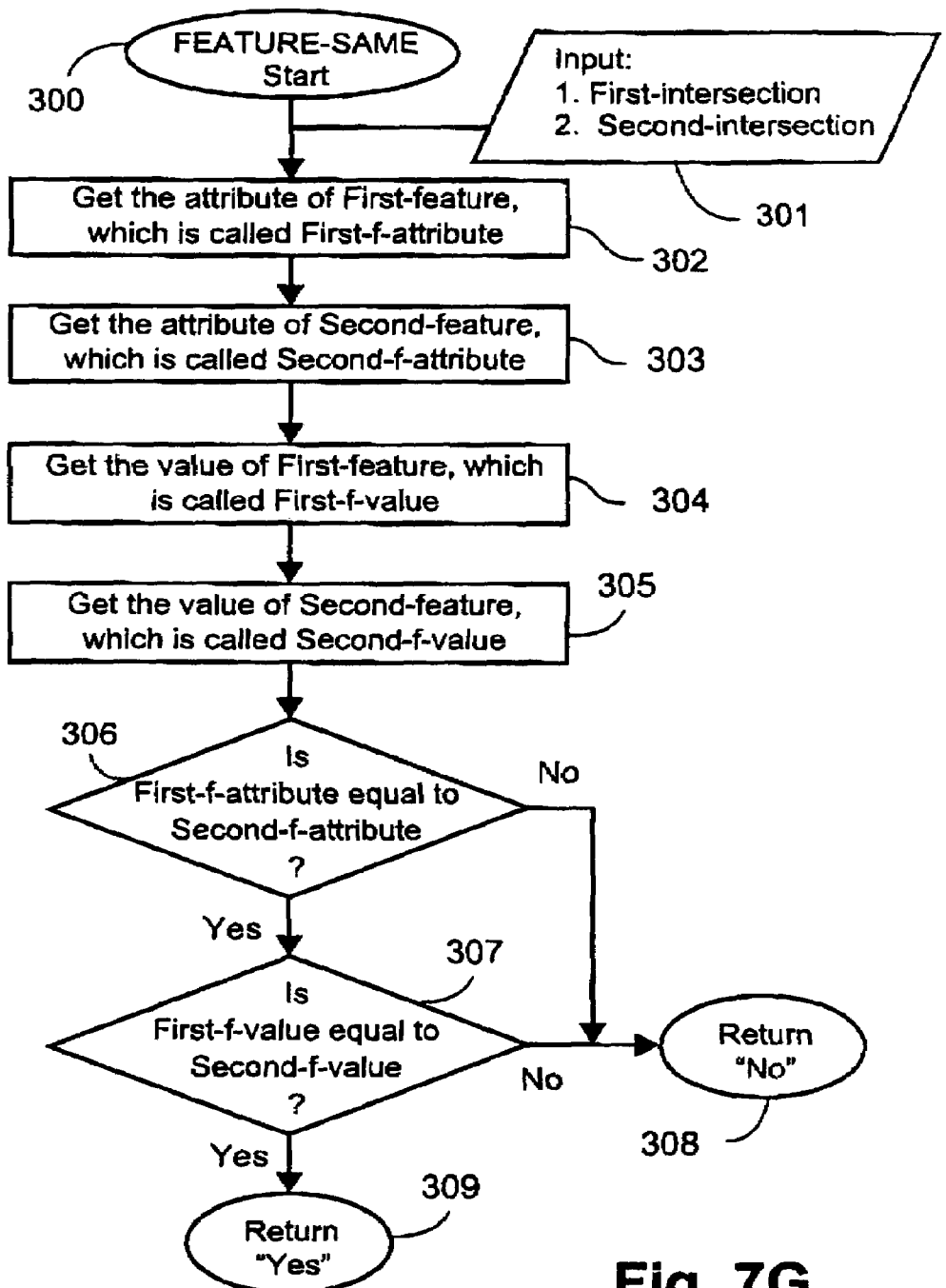

Referring now to FIG. 7G, sub-routine FEATURE-SAME is described, which checks whether two given features are the same. Therefore, in step 301 it receives as inputs, First-feature and Second-feature. Step 302 gets the attribute of First-feature, named First-f-attribute, and step 303 gets the attribute of Second-feature, named Second-f-attribute. Step 304 gets the value of First-feature, named First-f-value, and step 305 gets the value of Second-feature, named Second-f-value.

Step 306 determines whether First-f-attribute is the same as Second-f-attribute, and step 307 determines whether First-f-value is the same as Second-f-value. If the answers of both steps 306 and 307 are affirmative, then sub-routine FEATURE-SAME returns a "YES" in step 309. If any one of the answers of steps 306 and 307 is negative, then sub-routine FEATURE-SAME returns a "NO" in step 308.

Figure 7H:
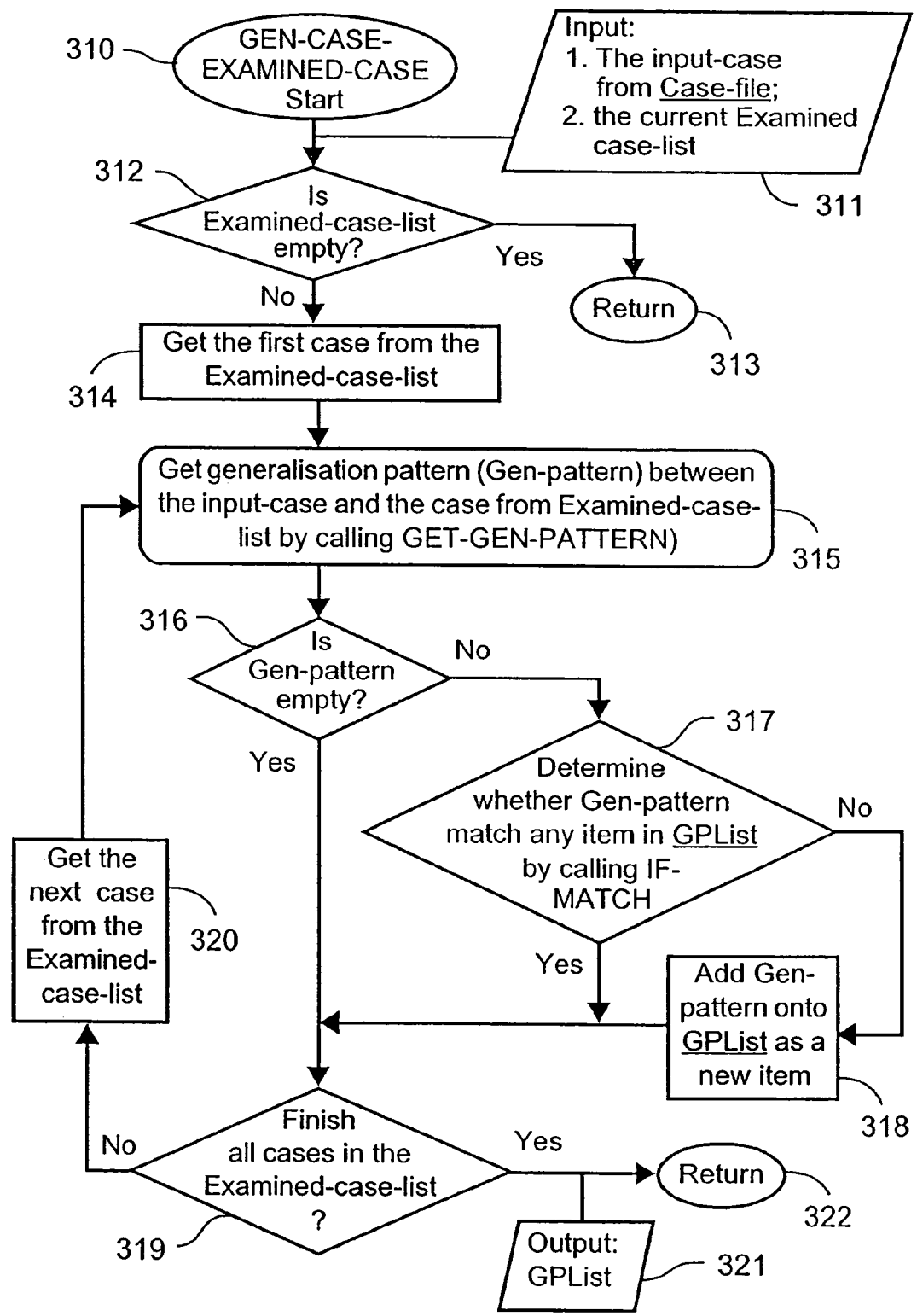

Sub-routine GEN-CASE-EXAMINED-CASES starts in step 310 in FIG. 7H. This sub-routine finds generalisation patterns between the input-case from Case-file and cases in the Examined-case-list, which it receives as inputs in step 311. Step 312 determines whether the Examined-case-list is empty and returns in step 313 if this is affirmative. IF the Examined-case-list has items, the sub-routine continues to step 314 where the first case from the Examined-case-list is retrieved. Step 315 calls subroutine GET-GEN-PATTERN to calculate a generalisation pattern, Gen-pattern, between the input-case and the case from the Examined-case-list. Sub-routine GET-GEN-PATTERN starts at step 330 in FIG. 7I.

Step 316 determines whether a Gen-pattern has been found. If a Gen-pattern has been found, the sub-routine determines in step 317 whether the Gen-pattern match any item in the GPList by calling sub-routine IF-MATCH. Sub-routine IF-MATCH starts at step 350 in FIG. 7J. If the Gen-pattern does not match any item in the GPList, then step 318 adds Gen-pattern to GPList as a new item and continues to step 319. If step 317 find that the Gen-pattern match an item in the GPList, then the sub-routine continues to step 319 where it is determined whether all cases in the Examined-case-list have been considered.

If step 319 determines that cases in the Examined-case-list remain to been considered, then step 320 retrieves the next case from the Examined-case-list and continues to step 315. Alternatively, step 321 outputs the GPList and the sub-routine GEN-CASE-EXAMINED-CASES returns in step 322.

Figure 7I:
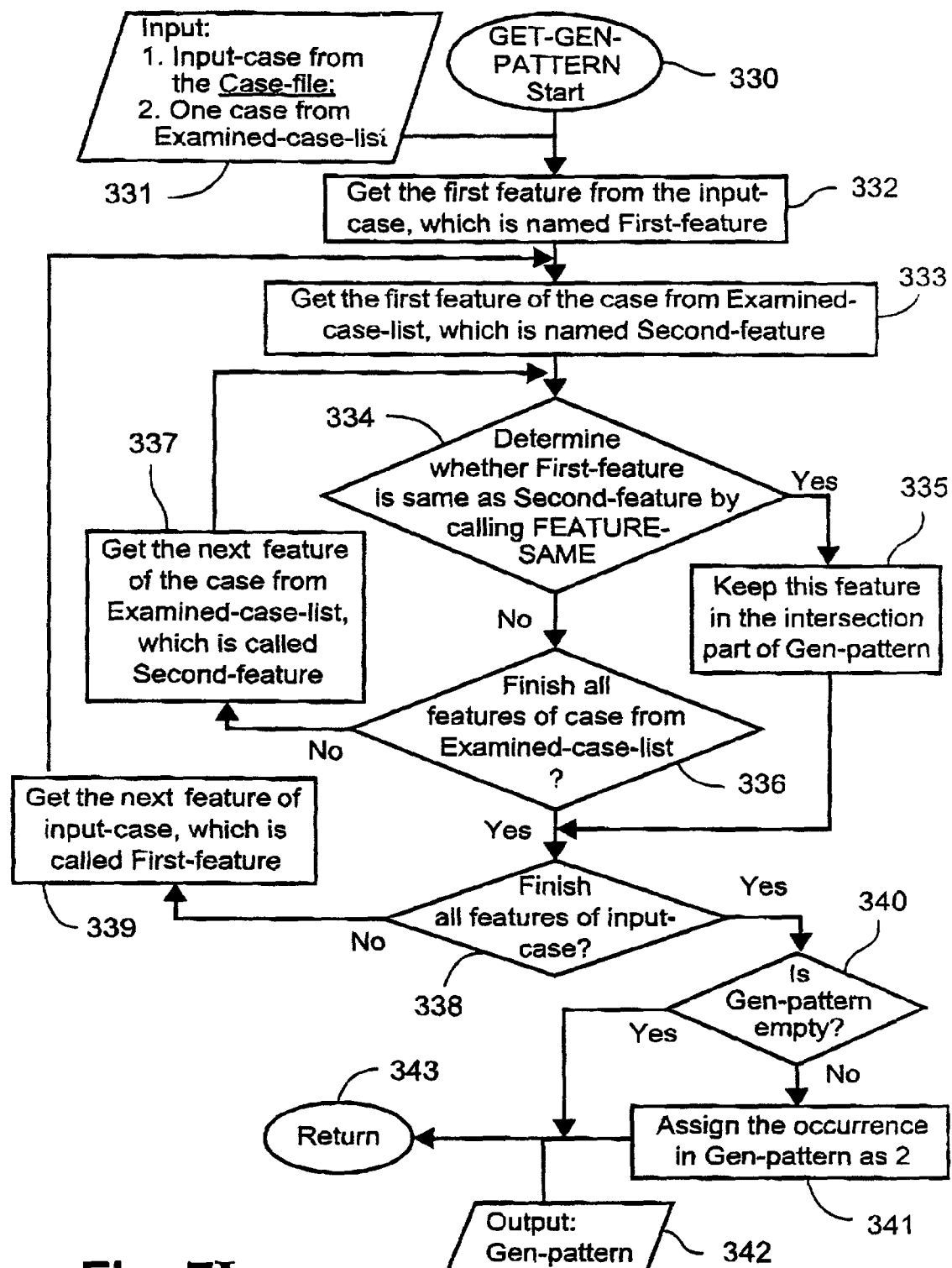

Referring to FIG. 7I, wherein sub-routine GET-GEN-PATTERN for identifying a generalization pattern, Gen-pattern, between an input-case from the Case-file and one case from the Examined-case-list, is shown. The sub-routine starts in step 330 by obtaining input-case and a case from the Examined-case-list as inputs in step 331. It takes these two cases as input and compares their features. If some features are shared by the two cases, then these shared features will be included in the intersection part of Gen-pattern. The occurrence in Gen-pattern will be 2. Otherwise, if no features are shared between the cases, an empty Gen-pattern will be produced as output.

Step 332 retrieves the first feature from the input-case, named First-feature, followed by step 333 where the first feature from the case from the Examined-case-list, named Second-feature, is retrieved. Step 334 calls sub-routine FEATURE-SAME to determine whether First-feature is the same as Second-feature. Sub-routine FEATURE-SAME starts at step 300 in FIG. 7G. If they are the same, then step 335 would keep this feature in the intersection part of Gen-pattern and proceeds to step 338. If step 334 determined that the features were not the same, then step 336 determines whether all the features of the case from the Examined-case-list have been considered. If this is affirmative, then the sub-routine continues to step 338. If not, then step 337 retrieves the next feature of the case from the Examined-case-list, names it Second-feature and continues to step 334. Step 338 determines whether all features of the input-case have been considered. If this is affirmative, then the sub-routine continues to step 340. However, if step 338 determined that all the features of the input-case have not been considered, then step 339 retrieves the next feature of the input-case, names it First-feature and continues to step 333.

Step 340 determines whether the Gen-pattern is empty. If the Gen-pattern is not empty, then the occurrence of Gen-pattern is made 2 in step 341 and the subroutine GET-GEN-PATTERN returns in step 343 after producing as output Gen-pattern in step 342. If step 340 determines that Gen-pattern is empty, the sub-routine GET-GEN-PATTERN also returns in step 343.

Figure 7J:
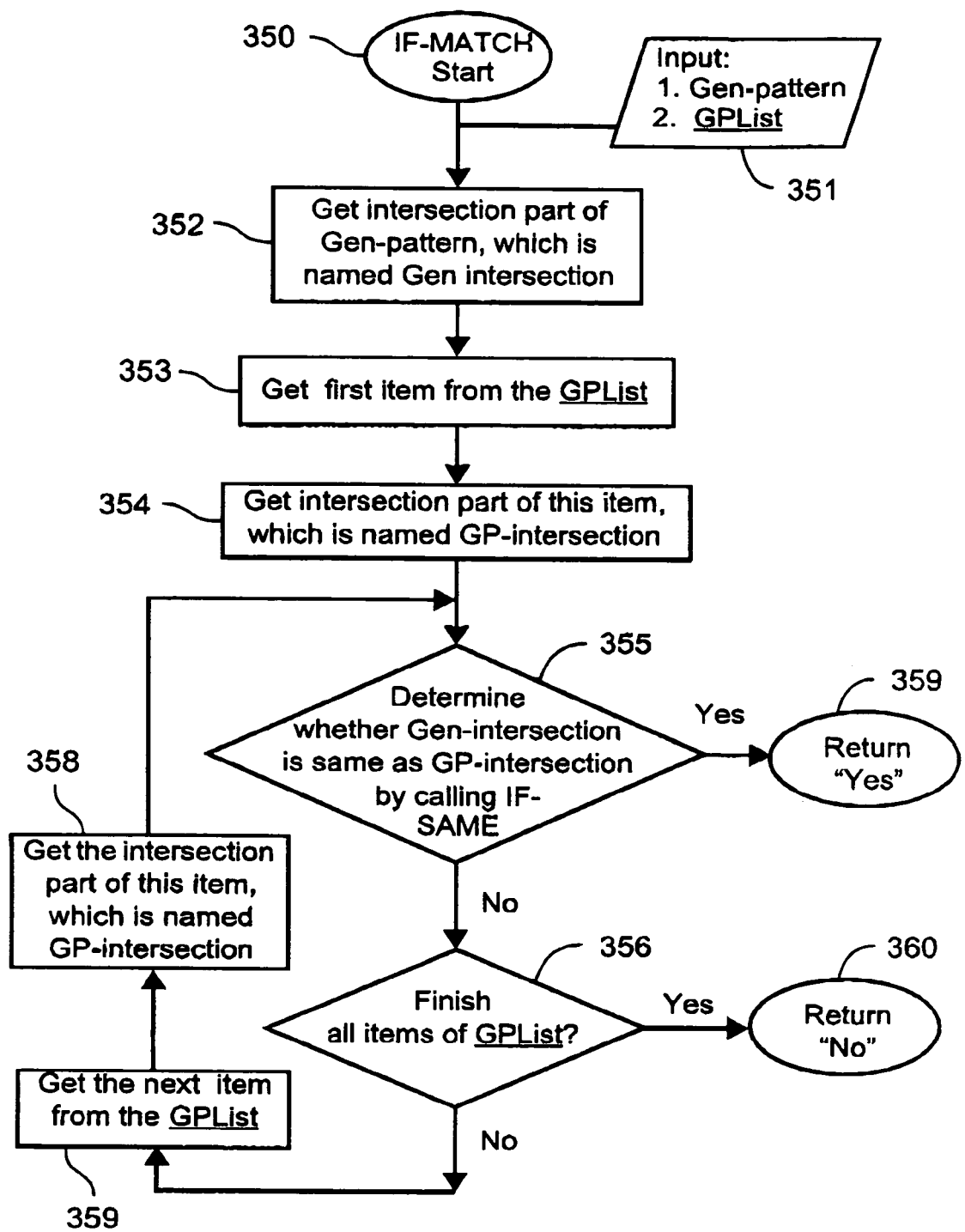

Referring to FIG. 7J, sub-routine IF-MATCH is shown. This sub-routine is to check whether the intersection of the generalisation pattern of Gen-pattern matches the intersection of GPList. The sub-routine starts in step 350 and accepts Gen-pattern and GPList as inputs in step 351.

Step 352 extracts the intersection part of Gen-pattern and name it Gen-intersection. Step 353 retrieves the first item from GPList and the intersection part of this item is extracted and named GP-intersection in step 354.

Figure 7K:
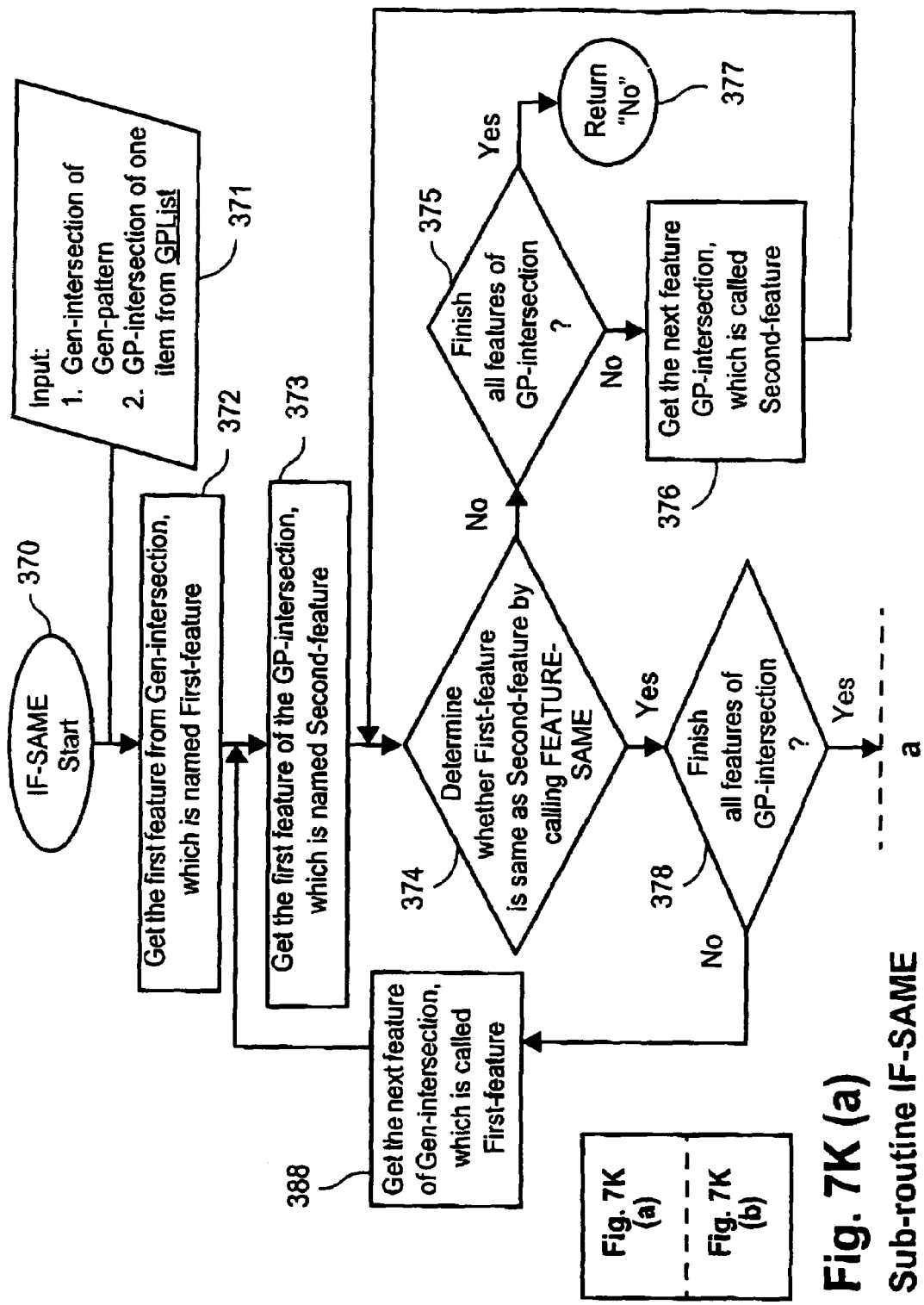
Figure 7K:
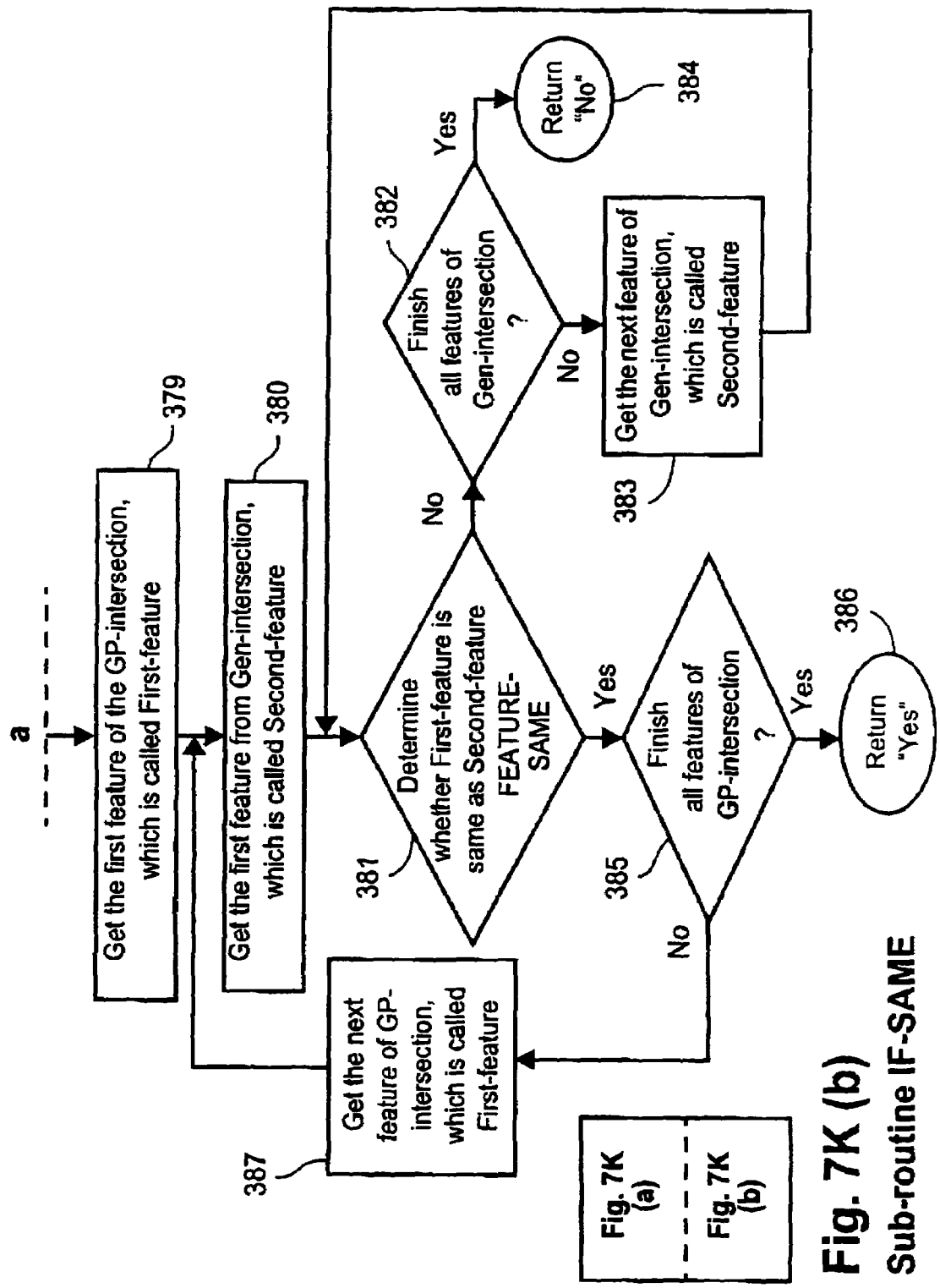

Step 355 calls sub-routine IF-SAME, which starts at step 370 in FIG. 7K, to determine whether Gen-intersection and GP-intersection are the same. If a match is found, then the sub-routine IF-MATCH returns a "YES" in step 359. If a match was not found in step 355, then step 356 determines whether all the items of GPList have been considered. If this is affirmative, then the sub-routine IF-MATCH returns a "NO" in step 360. However, If step 356 determines that there are items of GPList that were not yet considered, then step 357 retrieves the next item from the GPList, step 358 extracts the intersection part of the item and name it GP-intersection and the sub-routine continues to step 355.

Referring to FIG. 7K, subroutine IF-SAME is shown which check whether Gen-intersection and GP-intersection, obtained as inputs in step 371, are the same. Step 372 retrieves the first feature from Gen-intersection, named First-feature, followed by step 373 where the first feature from GP-intersection, named Second-feature, is retrieved. Step 374 calls sub-routine FEATURE-SAME to determine whether First-feature is the same as Second-feature. Sub-routine FEATURE-SAME starts at step 300 in FIG. 7G. If they are the same, then step 378 determines whether all the features of Gen-intersection have been considered. If this is affirmative, then the sub-routine continues to step 379. If not, then step 388 retrieves the next feature from Gen-intersection, names it First-feature and continues to step 373. However, if step 374 determined that First-feature is not the same as Second-feature, then step 375 determines whether all the features of the GP-intersection have been considered. If this is affirmative, then the sub-routine IF-SAME returns a "NO" in step 377. If features of the GP-intersection remain, then step 376 retrieves next feature from GP-intersection, names it Second-feature and continues to step 374.

Step 379 retrieves the first feature from GP-intersection, named First-feature, followed by step 380 where the first feature from Gen-intersection, named Second-feature, is retrieved. Step 381 calls sub-routine FEATURE-SAME to determine whether First-feature is the same as Second-feature. If they are the same, then step 385 determines whether all the features of GP-intersection have been considered. If this is affirmative, then the sub-routine IF-SAME returns a "YES" in step 386. If not, then step 387 retrieves the next feature from GP-intersection, names it First-feature and continues to step 380. However, if step 381 determined that First-feature is not the same as Second-feature, then step 382 determines whether all the features of the Gen-intersection have been considered. If this is affirmative, then the sub-routine IF-SAME returns a "NO" in step 384. If features of the Gen-intersection remain, then step 383 retrieves the next feature from Gen-intersection, names it Second-feature and continues to step 381.

In FIG. 6, an example of a viewer profile 500 for a particular viewer is shown. The Viewer profile 500 may correspond to the GPList determined by method shown in FIGS. 7A to 7K, performed by the learning module 39 of the avatar agent 37 associated with the particular viewer, with the GPList having the following intersections and occurrence values:

([Category='drama'], 6)

([Category='drama', Sub-category='social', Year_of_make='1999'], 3)

([Category='drama', Sub-category='social', Start_Time='2200', Year_of_make='1999'], 2)

([Sub-category='social'], 8)

([Sub-category='social', Day='Thu'], 2)

([Category='movie'], 10)

([Sub-category='social', Day='Mon'], 2)

([Category='movie', Sub-category='social'], 5)

([Sub-category='social', Day='Wed'], 2)

The columns 501 in FIG. 6 represent the attributes of the intersections and the entries represent the values 502 of the attributes. Each row 503 in the viewer profile 500 represents an item in the viewer profile 500. Each item 503 in the viewer profile 500 also has a Date_Stamp entry. In the preferred implementation, the Date_Stamp value of the item 503 is the date of the most recent viewer program selection 68 that contributed to the intersections in the item 503. Alternatively, the Date_Stamp value may be the average of the dates of all viewer program selections 68 that contributed to the intersections in the item 503. For example, the item 503 in the third row has the following values and interpretation:

| Attribute | Attribute-value | Interpretation |
| --- | --- | --- |
| Category_ID | 16 | Category = 'drama' |
| Subcategory_ID | 564 | Sub-category = 'social' |
| Start_Time | 2200 | Start_Time = '2200' |
| Day | −1 | Don't care |
| EPG_channel | −1 | Don't care |
| Year_of_Make | 1999 | Year_of_make = '1999' |

The occurrence of this intersection is 2 and the last time the viewer made a program selection 68 that contributed to this intersection was 24 Apr. 1999. All entries with "−1", are interpreted as "Don't care".

Operations within the recommendation module 40 will now be described in more detail. The recommendation module 40, according to the preferred implementation, uses a number of tasks to compile the list of viewer recommendations 67. Various tasks are defined, with each task defining a unique combination of a manner of ordering the viewer profile 500, and particular Relevance Filters for filtering the ordered viewer profile.

The first aspect of each of the tasks, in accordance with the present implementation, is the manner in which the viewer profile 500 is ordered. The ordering arrangements may include:

WeightFactor Ordering arranges the viewer profile entries 503 by descending occurrence value, ie. feature (fi) intersections occurring most frequently take precedence.

Specificity Ordering arranges the viewer profile entries 503 by descending specificity level, ie. entries 503 which specify more program attribute-value pairs than others take precedence.

Generality Ordering arranges the viewer profile entries 503 by ascending specificity level, ie. entries 503 which specify less program attribute-value pairs that others take precedence.

Recency Ordering arranges the viewer profile entries 503 by descending Date_Stamp, ie. most recent entries 503 take precedence.

WeightRecency Ordering arranges the viewer profile entries 503 by descending occurrence value, while preferring entries 503 having most recent Date_Stamp values when occurrence values are the same.

Specificity Weight Ordering arranges the viewer profile entries 503 by descending specificity level, while preferring entries 503 having higher occurrence values when specificity levels are the same.

Generality Weight Ordering arranges the viewer profile entries 503 by ascending specificity level, while preferring entries 503 having higher occurrence values when specificity levels are the same.

Recency Specificity Ordering arranges the viewer profile entries 503 by descending Date_Stamp, while preferring more specific entries 503 when Date_Stamp values are the same.

The following possible orderings may be useful:

Specificity Recency Ordering arranges the viewer profile entries 503 by descending specificity level, while preferring most recent entries 503 when specificity levels of entries are the same.

Generality Recency Ordering arranges the viewer profile entries 503 by ascending specificity level, while preferring most recent entries 503 when specificity levels of entries are the same.

The second aspect of each of the tasks, in accordance with the present implementation, is the particular Relevance Filters applied to the ordered viewer profile, which includes:

TimeSlot Filter verifies whether a viewer profile entry 503 is time- or day-specific and verifies the specific time and/or day with the day and time for which recommendations are requested.

Condition to reject Viewer profile entries 503: Start_Time is specified in the viewer profile entry 503, but is not equal to the time for which recommendations are requested or Day is specified in the viewer profile entry 503, but is not equal to the day for which recommendations are requested. The TimeSlot Filter is included in all filter operations.

WeightFactor Filter verifies whether a viewer profile entry 503 has an occurrence value that is higher than a current average occurrence value of all the viewer profile entries 503.

Condition to reject Viewer profile entries 503: Occurrence value <= average occurrence value.

Popularity Filter verifies whether a viewer profile entry 503 corresponds to a (currently) popular event/program, eg. Football World Cup, Celine Dion concert.

Condition to reject viewer profile entries 503: When the POPULARITY value is false.

Urgency Filter verifies whether a viewer profile entry 503 may be met by an urgent program, eg. special news/progress reports, weather announcements (tornado warnings, etc.), press conferences, nation addresses and so on. Condition to reject viewer profile entries 503: When the URGENCY value is false.

LifeStyle Filter verifies whether a viewer profile entry 503 corresponds to a (known) type of a lifestyle, eg., Midday movies, 7 pm news, or Saturday night music shows.

Condition to reject Viewer profile entries 503: When the LIFESTYLE value is false.

By combining filter characteristics together, other filters can be obtained. For example, PopularLifeStyle Filter verifies whether a viewer profile entry 503 corresponds to a (known) type of a lifestyle and (currently) popular event/program, eg., Celine Dion concert on Saturday night.

Such combinations are significantly restrictive, and a task filtering ordered viewer profile entries with a combined filter may reject most if not all viewer profile entries 503. Therefore, it is expected that only a small proportion of viewers (most demanding ones) may value a task that includes such a filter.

Certain of the tasks provide recommendations due to more established Viewer profile entries 503 (gradual change), whereas other tasks attempt to produce viewer recommendations based on a sudden change in the viewer's viewing habits.

Using combinations of both the first (ordering) and second (filtering) aspects of the tasks, a number of useful tasks may be defined including:

Gradual Change Tasks
Basic Task=Weight Factor Ordering+TimeSlotFilter (broad-minded viewer)
DieHard Task=Specificity Weight Ordering+WeightFactor Filter (old habits die hard)
OldFavourites Task=Generality Weight Ordering+WeightFactor Filter (original recipe)
BestPick Task=Specificity Weight Ordering+Popularity Filter (choosy viewer)
Prime Time Task=Weight Recency Ordering+LifeStyle Filter (my TV—my castle)
Sudden Change Tasks
HotTopic Task=Recency Specificity Ordering+Popularity Filter (sudden change due to popularity change)
NewLife Task=Recency Specificity Ordering+LifeStyle Filter (sudden change due to life style change)
WatchDog Task=Recency Specificity Ordering+Urgency Filter (sudden change due to crisis situation).

Because different viewers may be satisfied with viewer recommendations produced as a result of the execution of different tasks, each task has an associated viewer specific Task_Value, indicating the particular viewer's satisfaction with the viewer recommendations 67 provided by the particular task. The Task_Value is also stored in the viewer profile database 23 and each task, represented by a unique Task_ID, may be stored as follows:

| Task_ID | Number |
|---|---|
| Task_Value | Number |
| Task_Type | gradual or sudden change |

Generally, an optimal set of viewer recommendations 67 is obtained as a result of a balance between various tasks. In the preferred implementation, a combination of gradual change tasks and sudden change tasks is used to compile the viewer recommendations 67.

Figure 8:
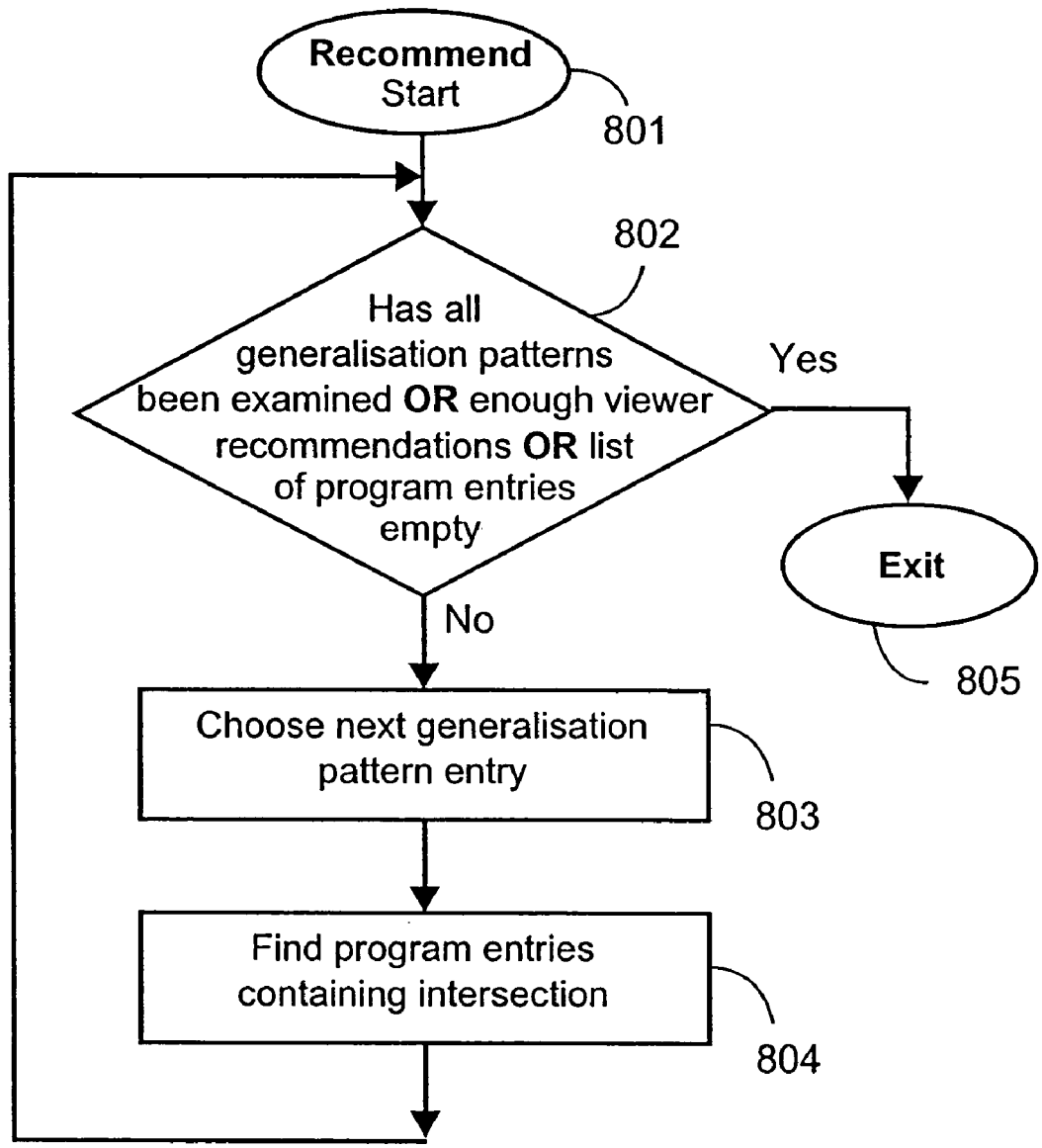
FIG. 8 is a flow diagram of a method performed by a recommendation module of the avatar agent illustrated in FIG. 1B, reasoning to best use the results from the learning module to make recommendations of programs to watch to the viewer.

Referring to FIG. 8, when the recommendation module 40 is instructed by the avatar manager 38 to provide television program recommendations, the procedure RECOMMEND is started in step 801. As inputs the procedure RECOMMEND receives:

The Viewer profile 500 from the viewer profile database 23, which includes viewer profile entries 503. Each viewer profile entry 503 includes the intersecting features and the occurrence count;

A list of program entries and their features (fi) from which to select viewer recommendations 67. This list was retrieved by the avatar manager 38 based on the time/date combination provided by the viewer for which viewer recommendations are required; and a predetermined maximum number of recommended programs;

Initially the list of viewer recommendations is empty. If it is determined in step 802 that all the viewer profile entries 503 have been examined or that there are already the predetermined maximum number of viewer recommendations or that the list of program entries is empty, then the procedure continues to step 805 where the list of viewer recommendations are passed to the avatar manager 38. Otherwise, the procedure would continue to step 803, wherein a next viewer profile entry 503 is selected according to a selection criterion. The selection criterion may be one of the following:

Choose the next viewer profile entry 503 with the lowest occurrence, (i.e. start from a more specific match).
Choose the next viewer profile entry 503 with the highest occurrence (i.e. start from the most general match)
Choose the next viewer profile entry 503 with the greatest number of features in the intersection (i.e. the most specific match)

In step 804, all program entries 60 in the list of program entries whose features (fi) includes those in the viewer profile entry 503 chosen in step 803, are moved from the list of program entries to the list of viewer recommendations. The procedure goes back to step 802.

Figure 9A:
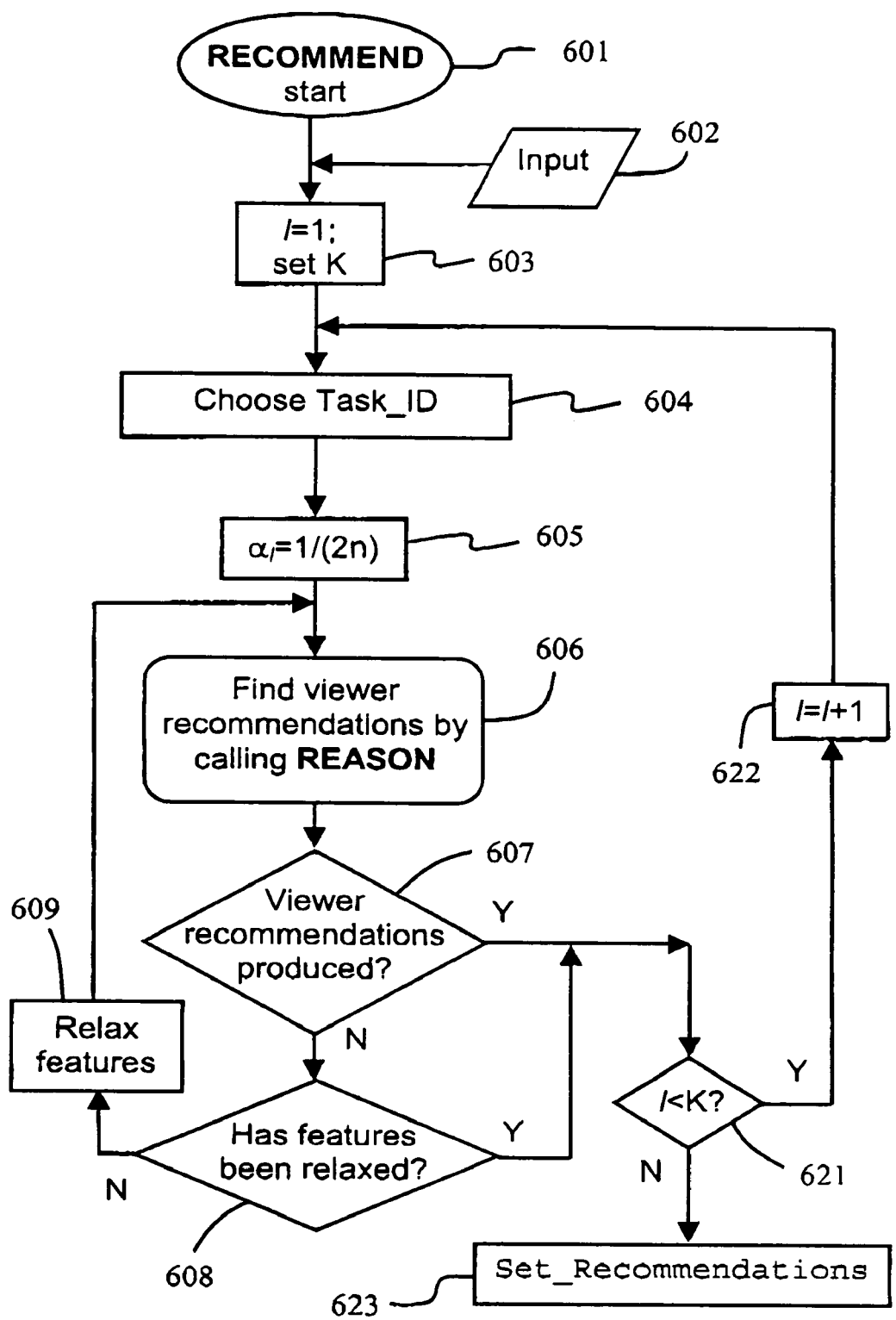
FIGS. 9A to 9F are flow diagrams of an alternative method of reasoning to best use the results from the learning module to make recommendations of programs to watch to the viewer.

Referring to FIG. 9A where an alternative procedure for providing television program recommendations is shown. Procedure RECOMMEND is started in step 601. In step 602 the procedure RECOMMEND receives as inputs:

The Viewer profile 500 from the viewer profile database 23, which includes viewer profile entries 503. Each viewer profile entry 503 includes the intersecting features, the Date_Stamp and the occurrence count;

The viewer specific Task_Values;

A list of program entries and their features (fi), retrieved from the EPG databases 22; and A predetermined desired number of recommended programs R.

In step 603 a counter l is set to a value of 1. A variable K is also set, where K represents the number of tasks used by the recommendation module to provide viewer recommendations 67. In the preferred implementation, the gradual change task having a maximum Task_Value and all the sudden change tasks are used. Hence, the variable K is set as the number of sudden change tasks plus 1.

This is followed by step 604 where a task, identified by its Task_ID, is chosen. With the counter l equal to 1, step 604 chooses the gradual change task with a maximum Task_Value. If the counter l is larger than 1, the next sudden change task is chosen.

Step 605 sets a variable $\alpha_l$. The variable $\alpha_l$ represents the desired portion of viewer recommendations that the recommendation module 40 would determine that would be made up from the task chosen in step 604. Accordingly, the variable $\alpha_l$ is set as 1/(2n), with n being 1 or K−1 for gradual and sudden change tasks respectively.

Step 606 calls sub-routine REASON for applying the chosen task and for producing viewer recommendations 67. Sub-routine REASON starts at step 650 in FIG. 9B.

Step 607 determine whether the REASON sub-routine has produced at least 1 recommendation for the chosen task. If the REASON sub-routine was unable to produce the at least 1 recommendation, then the intersecting features of the viewer profile entry 503 are relaxed in step 609. In the preferred implementation, all intersections are ignored except for category and sub-category, if they exist as intersections. The procedure RECOMMEND returns to step 606 where the sub-routine REASON is called again with the relaxed features.

If step 608 determines that the features of the viewer profile entry 503 were already relaxed, then the procedure RECOMMEND continues to step 621.

If step 607 determines that the REASON sub-routine was able to produce at least one recommendation for the chosen task, then step 621 determines whether the counter l is still smaller than variable K. If the counter l has a value of K, then recommendations for the desired tasks have been produced and the procedure RECOMMEND continues to step 623 where the SetRecommendations message, containing a list of recommended programs, is passed to the avatar manager 38, from where it is sent to the DTV agent 36. Alternatively, the recommendation module 40 may send the SetRecommendations message directly to the DTV agent 36.

However, if step 621 determines that the counter l is smaller than variable K, then viewer recommendations for certain tasks must still be produced. Therefore, step 622 increments the counter l and the procedure RECOMMEND returns to step 604 for determining viewer recommendations for a next task.

Figure 9B:
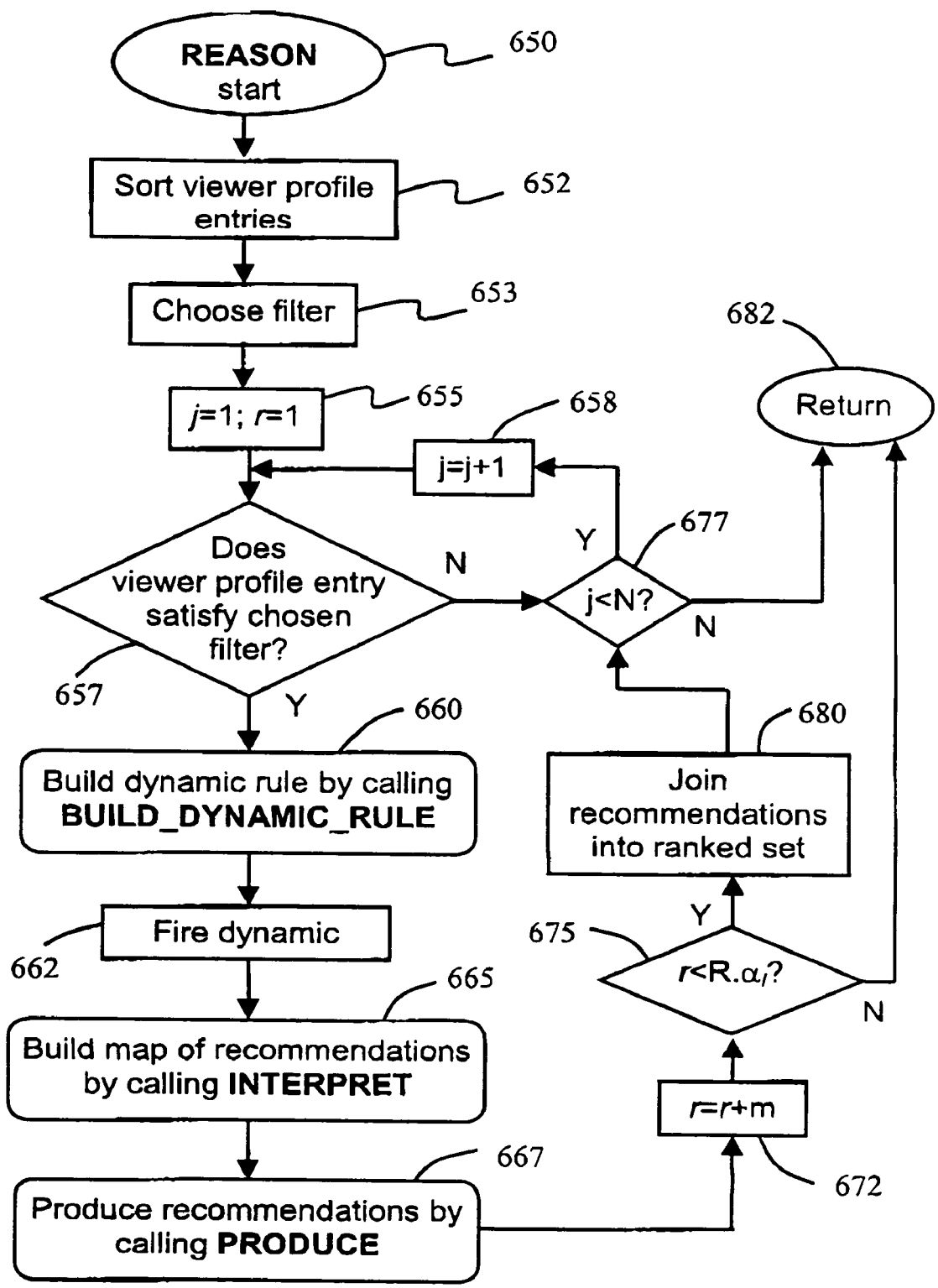

Referring to FIG. 9B wherein the sub-routine REASON for applying the chosen task and for producing viewer recommendations is shown. Sub-routine REASON starts in step 650.

Step 652 orders the viewer profile entries 503 by applying the ordering aspect of the task selected in step 604 of the RECOMMEND procedure. For example, if the gradual change task DieHard task was selected, then the viewer profile entries 503 are ordered by the Specificity Weight Ordering which arranges the viewer profile entries 503 by descending specificity level, while preferring entries 503 having higher occurrence values when specificity levels are the same. Step 653 identifies the filter, specified by chosen task. For example, with the DieHard task, step 653 identifies the filter WeightFactor Filter, which verifies whether a viewer profile entry 503 has an occurrence value that is higher than a current average occurrence value of all the viewer profile entries 503.

Step 655 sets a viewer profile entry counter j to a value of 1 and a recommendations counter r to a value of 0. In step 657 it is determined whether the j-th ordered viewer profile entry 503 satisfies the chosen filter from step 653. It is again noted that the TimeSlot Filter is always included in all filter operations whereby all viewer profile entries 503 with specific Start_Time, Start_Day or Start_Date (ie not equal to −1: don't care), and where the specific Start_Time Start_Day or Start_Date is not equal to the current time, current day or current date respectively, are removed.

If step 657 determines that the j-th ordered viewer profile entry 503 does not satisfy the chosen filter, then the sub-routine REASON continues to step 677 for determining whether the viewer profile counter j is still smaller than the total number of viewer profile entries 503, N.

Figure 9C:
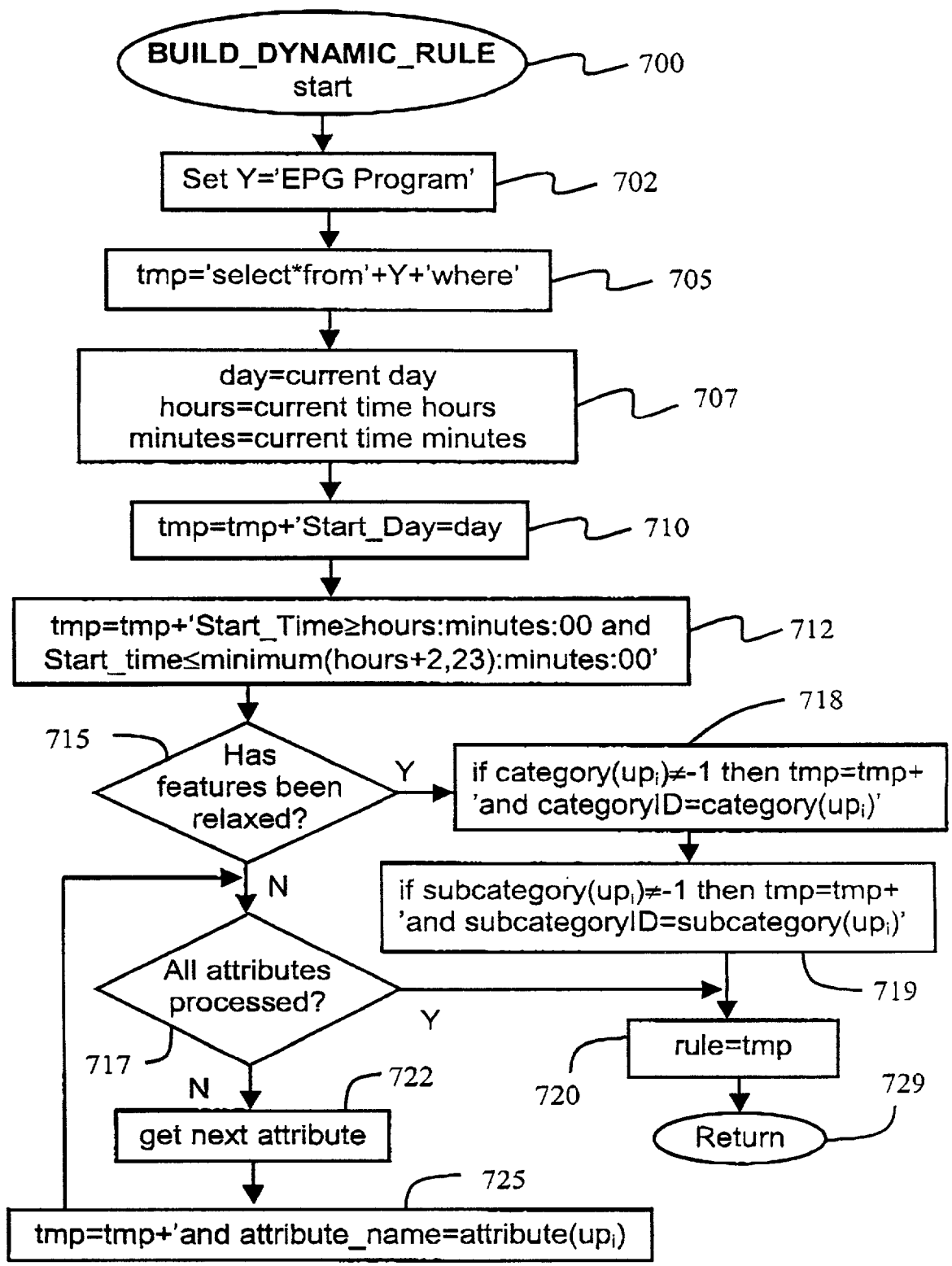

Alternatively, if step 657 determines that the j-th ordered viewer profile entry 503 does satisfy the chosen filter, then the sub-routine REASON continues to step 660 where a dymanic rule is build as EPG database filter by calling sub-routine BUILD_DYNAMIC_RULE. The sub-routine BUILD_DYNAMIC_RULE is shown in FIG. 9C and starts in step 700.

Figure 9D:
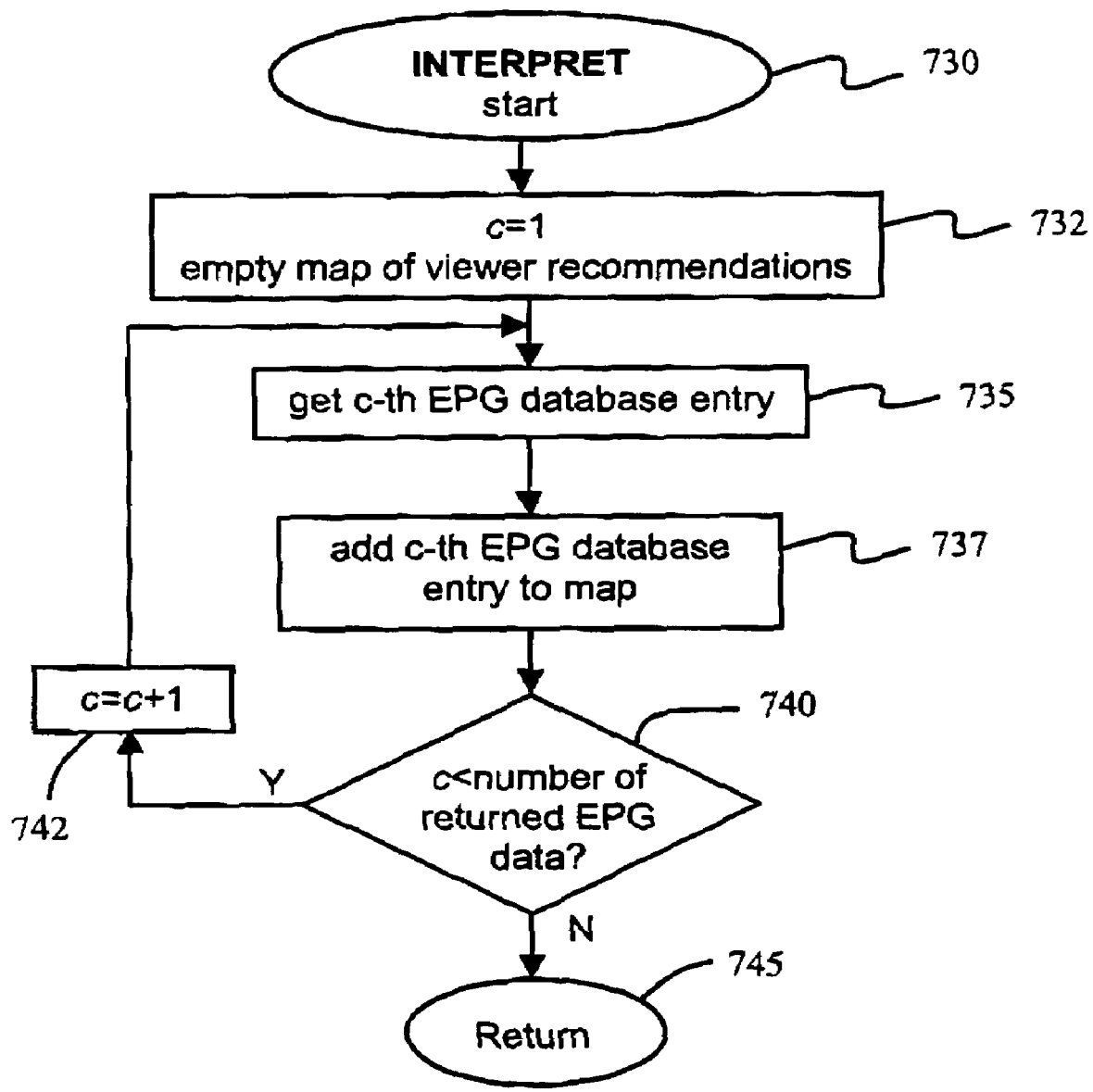

Step 662 applies the rule that was built in the sub-routine BUILD_DYNAMIC_RULE on the entries 60 of the EPG databases 22 to identify m EPG database entries 60 that satisfies the rule. This is followed by step 665 which calls the sub-routine INTERPRET. Sub-routine INTERPRET builds a map of recommendations and is shown in FIG. 9D.

Figure 9E:
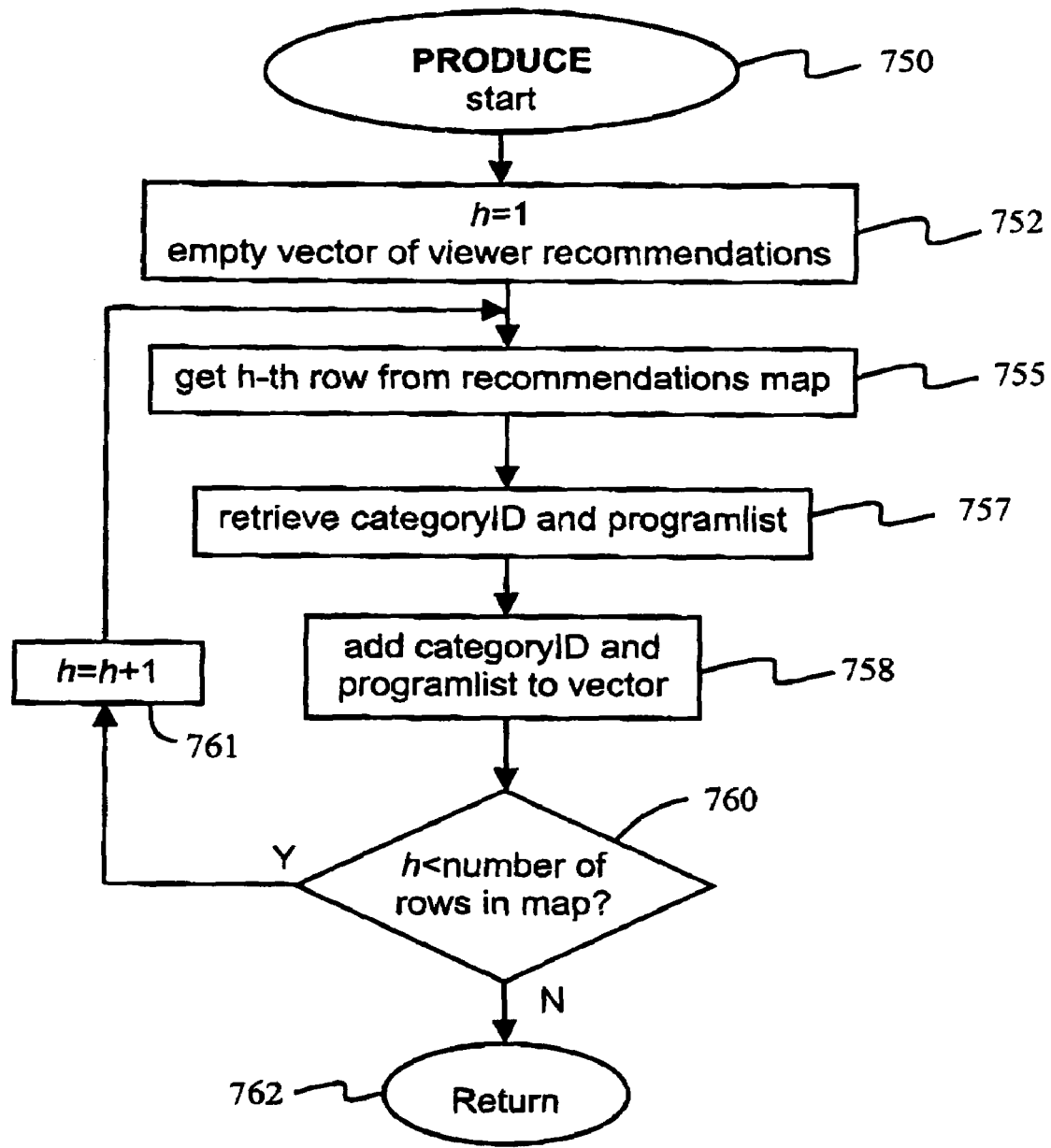

Sub-routine PRODUCE is called in step 667 which produces an ordered list of viewer recommendations from the map of recommendations. Sub-routine PRODUCE is shown in FIG. 9E and starts in step 750.

Step 672 calculates the recommendations counter r to be the previous count plus the number m of recommendations produced by sub-routine PRODUCE called in step 667. Step 675 determines whether the recommendations counter r is smaller than the portion $\alpha_l$ of the predetermined desired number R of recommended programs. If the determination of step 675 is negative, then a sufficient number of recommendations were created for that task and the sub-routine REASON continues to step 682. Alternatively, if step 675 determines that not enough recommendations were created, the sub-routine REASON continues to step 680 where the list of ordered recommendations, is joined in a ranked set X. This is done by, for each entry from the ordered list of recommendations, determining whether the entry already exists in the ranked set X. If the entry already exists, the entry is ignored and the next entry is considered. However, if the entry does not yet exist, then it is entered at the end of the ranked set X.

Step 677 then determines whether the viewer profile counter j is still smaller than the total number of viewer profile entries 503 and if so, directs the sub-routine REASON to step 658 where the counter j is incremented before directing the sub-routine back to step 657. This allows more recommendations to be determined by finding a next viewer profile entry 503 that meet the filter criteria.

From step 675, or from step 677 when all the viewer profile entries 503 have been considered, the sub-routine REASON returns to the procedure RECOMMEND in step 682.

Referring to FIG. 9C wherein the sub-routine BUILD_DYMANIC_RULE is shown. Sub-routine BUILD_DYMANIC_RULE builds a dynamic rule for the ordered viewer profile entry 503 that satisfied the chosen filter, and starts in step 700.

Step 702 sets a string Y as the source of the EPG program database 22. The string Y, and hence the EPG program database 22 is formulated in a string "tmp" in step 705. Steps 707 to 712 set variables day, hours and minutes as the date and time for which recommendations should be provided. This date and time were obtained from the DTV agent in the SendRecommendationRequest message. The variables day, hours and minutes are added to the string "tmp", allowing a 2 hour window around the hours variable.

Step 715 determines whether the intersecting features of the viewer profile entry 503 were relaxed by performing step 609. The sub-routine BUILD_DYMANIC_RULE continues to step 718 if the intersecting features of the viewer profile entry 503 were relaxed, where the category of the ordered viewer profile entry 503, if it is not equal to −1 (don't care), is added to the string "tmp". Similarly, in step 719 the sub-category of the ordered viewer profile entry 503 is added to the string "tmp" if it is determined not to be equal to −1 (don't care). The sub-routine then proceeds to step 720.

If step 715 determines that the intersecting features have not been relaxed, then step 717 determines whether all the attributes of the ordered viewer profile entry 503 have been processed. If so, then a string "rule" is set to be equal to the string "tmp" in step 720 before sub-routine BUILD_DYMANIC_RULE returns to the sub-routine REASON in step 729.

However, if there are unprocessed attributes of the ordered viewer profile entry 503, then steps 722 and 725 gets the next attribute whose value is not −1 (don't care) and add that attribute to the string "tmp". The sub-routine continues to step 717.

Referring now to FIG. 9D wherein the sub-routine INTERPRET is shown. Sub-routine INTERPRET builds a map of recommendations from the returned EPG database entries 60, and starts in step 730.

The sub-routine INTERPRET is initialised in step 732 by setting the map of viewer recommendations as empty, and setting a counter c as 1. Step 735 gets the c-th entry of the returned EPG database entries 60 and step 737 adds this entry to the map of recommendations according to the category of the entry. The map of recommendations will have as entries rows having the categories, followed by all the returned EPG database entries 60 having a particular category as a feature. Each row would typically have a different number of fields.

Step 740 determines whether the variable c is smaller than the total of returned EPG database entries 60, or in other words, whether all the returned EPG database entries 60 have been entered into the map of recommendations. If it is determined in step 740 that all the returned EPG database entries 60 have not been added, then the variable c is incremented in step 742 and the sub-routine INTERPRET continues again to step 735.

However, if step 740 determines that all the returned EPG database entries 60 have been added to the map of recommendations, then step 745 returns the sub-routine INTERPRET to the subroutine REASON.

Referring to FIG. 9E wherein the sub-routine PRODUCE for producing m viewer recommendations is shown. Sub-routine PRODUCE starts in step 750.

The sub-routine PRODUCE is initialised in step 752 by setting the vectors of recommendations is shown. Sub-routine PRODUCE starts in step 750.

The sub-routine PRODUCE is initialised in step 752 by setting the vectors of recommendations as empty, and setting a counter h as 1. Step 755 gets the h-th row from the recommendations map and step 757 retrieves a first component of the h-th row of the recommendations map as the category ID and a second component as all the returned EPG database entries 60 (or programs) with that category as a feature. Step 758 adds the first and second components together into a vector of categorised recommendations.

Step 760 determines whether the variable h is smaller than the total number of rows in the recommendations map, or in other words, whether all the rows in the recommendations map have been converted into vectors. If it is determined in step 760 that the recommendations map has not been fully converted, then the variable h is incremented in step 761 and the sub-routine PRODUCE continues again to step 755.

However, if step 760 determines that all the rows of the recommendations map have been converted, then step 762 returns the sub-routine PRODUCE to the subroutine REASON.

Figure 9F:
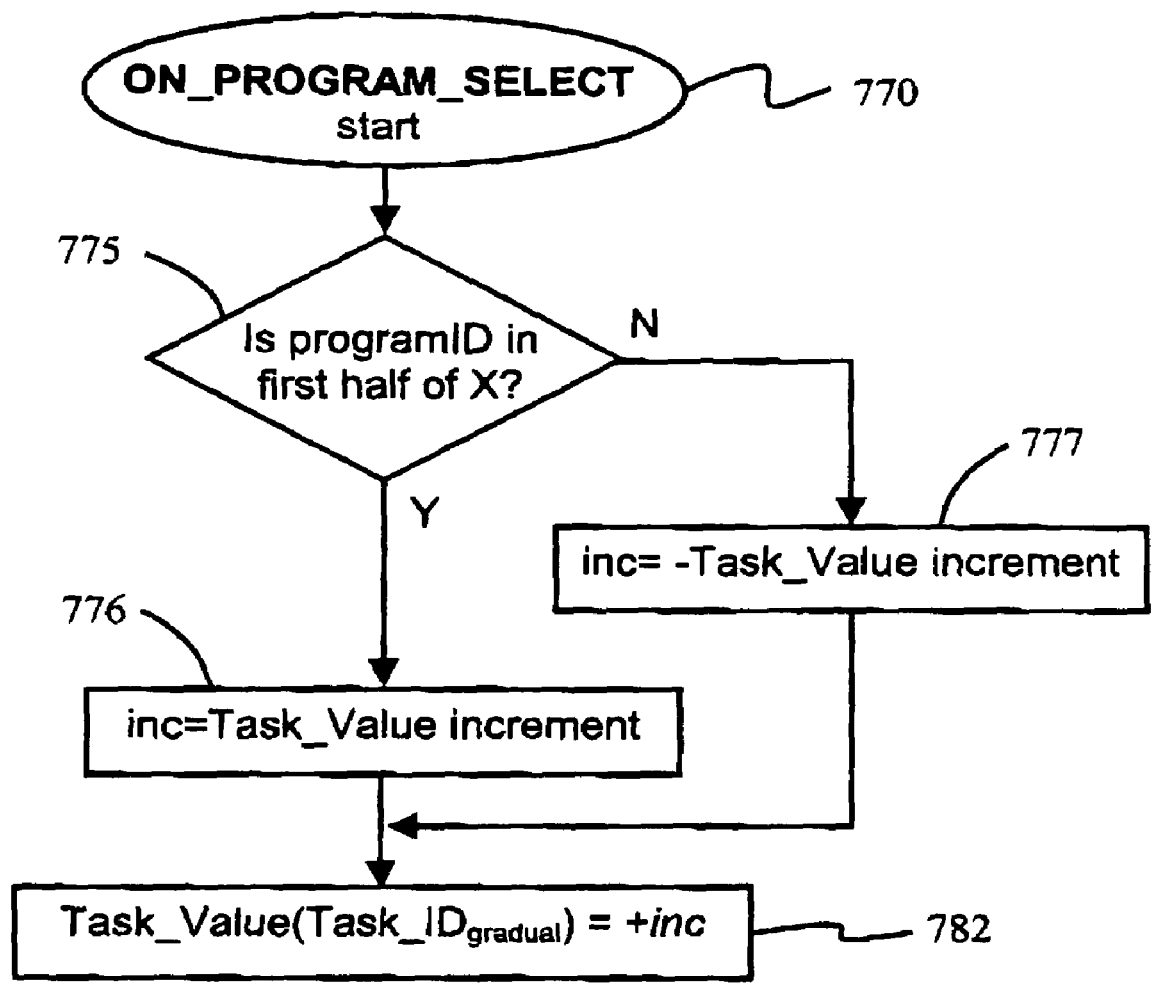

When the avatar manager 38 receives the message SetProgramSelection from the DTV agent 36 (step 13 of Table 2), indicating that the viewer has selected a particular program 68, the avatar manager 38 calls routine ON_PROGRAM_SELECT, which is shown in FIG. 9F and starts in step 770. Step 775 determines whether the selected program was within the first half of the ranked list of recommendations X. If this determination is found to be true, then a variable inc, which is a Task_Value increment, is set to a positive value in step 776. Alternatively, the variable inc is set to a negative value in step 777.

After setting the variable inc in step 776 or step 777, step 782 adds the variable inc to the Task_Value of the Gradual Change task selected in step 604 of the RECOMMEND procedure. Therefore, if the selected program is in the upper halve of the set of ranked recommendations X, then the viewer recommendation 67 are deemed to have been successful, and the Task_Value of the gradual task used by the recommendation module 40 is increased, thereby ensuring that it will again be used for future recommendations. However, if the selected program was listed in the lower half of the set of ranked recommendations X, the recommendation possibly was not optimal, and the Task_Value of the gradual task used by the recommendation module 40 is decreased.

In an alternative implementation, sub-routine INTERPRET records the Task_ID of the task(s) producing each of the recommendations. This allows the routine ON_PROGRAM_SELECT to only adjust the Task_Value of the task that produced the selected recommendation.

Figure 10:
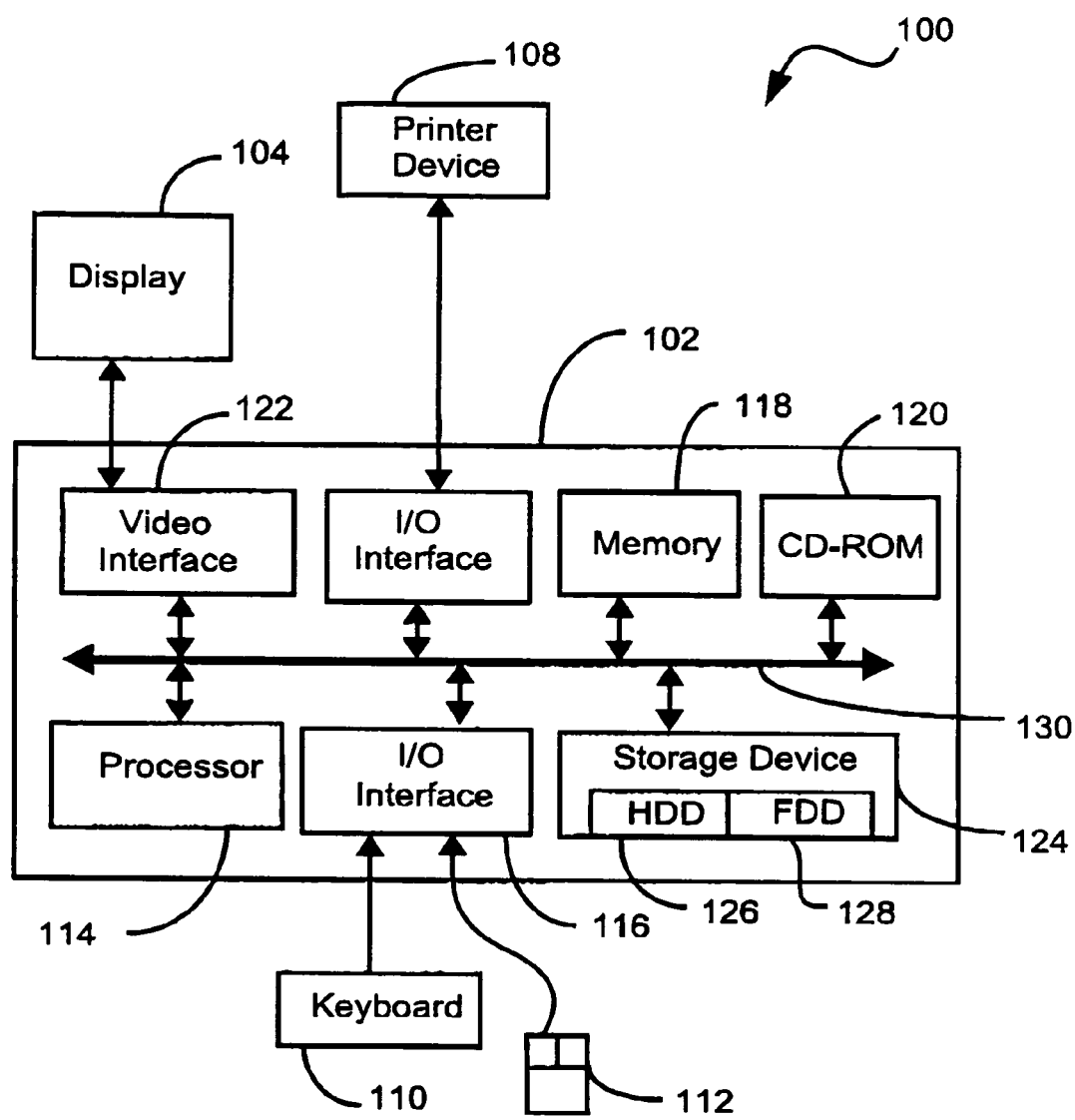
FIG. 10 is a schematic block diagram of a general-purpose computer upon which arrangements described can be practiced.

The methods of FIGS. 7A to 7K, and FIG. 8 or FIGS. 9A to 9F, may be practiced using a conventional general-purpose computer system 100, such as that shown in FIG. 10 wherein the processes of FIGS. 7A to 7K, FIG. 8 and FIG. 9 may be implement as software, such as an application program executing within the computer system 100. In particular, the steps may be instructions in the software that are carried out by the computer. The software may be stored in a computer readable medium, including the storage devices described below. The software is loaded into the computer from the computer readable medium, and then executed by the computer. A computer readable medium having such software or computer program recorded on it is a computer program product. The use of the computer program product in the computer preferably effects an advantageous apparatus in accordance with the implementations of the invention.

The computer system 100 comprises a computer module 102, input devices such as a keyboard 110 and mouse 112, output devices including a printer 108 and a display device 104.

The computer module 102 typically includes at least one processor unit 114, a memory unit 118, for example formed from semiconductor random access memory (RAM) and read only memory (ROM), input/output (I/O) interfaces including a video interface 122, and an I/O interface 116 for the keyboard 110 and mouse 112. A storage device 124 is provided and typically includes a hard disk drive 126 and a floppy disk drive 128. A magnetic tape drive (not illustrated) may also be used. A CD-ROM drive 120 is typically provided as a non-volatile source of data. The components 114 to 128 of the computer module 102, typically communicate via an interconnected bus 130 and in a manner which results in a conventional mode of operation of the computer system 100 known to those in the relevant art. Examples of computers on which the implementations can be practised include IBM-PC's and compatibles, Sun Sparestations or alike computer systems evolved therefrom.

Typically, the application program of the preferred implementation is resident on the hard disk drive 126 and read and controlled in its execution by the processor 114. Intermediate storage of the program may be accomplished using the semiconductor memory 118, possibly in concert with the hard disk drive 126. In some instances, the application program may be supplied to the viewer encoded on a CD-ROM or floppy disk and read via the corresponding drive 120 or 128, or alternatively may be read by the viewer from a network via a modem device (not illustrated). Still further, the software can also be loaded into the computer system 100 from other computer readable medium including magnetic tape, a ROM or integrated circuit, a magneto-optical disk, a radio or infra-red transmission channel between the computer module 102 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The methods of FIGS. 7A to 7K, FIG. 8 and FIGS. 9A to 9F may alternatively be implemented in dedicated hardware such as one or more integrated circuits performing the functions or sub functions of FIGS. 7A to 7K, FIG. 8 and FIGS. 9A to 9F. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiment being illustrative and not restrictive.

We claim:

1. A method of enabling a selection of a program for viewing in a television system, the method comprising the steps of:
   recording attributes associated with each program selected by a user in the television system, said attributes comprising first attributes associated with characteristics of said programs and second attributes associated with the user at a time the programs are selected, wherein said first attributes are made available as Electronic Program Guide (EPG) data;
   forming sets of said attributes in response to said user selecting at least two of said programs having shared attributes, wherein each of said sets comprises at least two of said attributes; and
   upon entry of a user request for a program recommendation, performing a search for programs with attributes that include all the attributes of at least one of said sets, and displaying to said user programs with attributes that include all the attributes of at least one of said sets as program recommendations.

2. A method according to claim 1, wherein said second attributes include a mood being experienced by said user.

3. A method according to claim 1, wherein said program recommendations are based on the programs with the greatest number of attributes included in said sets.

4. A method according to claim 1, comprising the further step of:
   associating a value with each set, said value representing the number of programs selected by said user including the attributes in said set, wherein said search is performed for programs with attributes that include the attributes of the set with a highest value.

5. A method according to claim 4, wherein said program recommendations are further based on the programs with the greatest number of attributes included in said sets.

6. A method according to claim 1, wherein said second attributes further include information associated with the viewing of programs.

7. A method according to claim 6, wherein said information associated with the viewing includes one or more of time of day and day of week information.

8. A recommendation system for enabling a selection of a program for viewing in a television system, the recommendation system comprising:
   memory means for recording attributes associated with each program selected by a user in the television system, said attributes comprising first attributes associated with characteristics of said programs and second attributes associated with the user at a time the programs are selected, wherein said first attributes are made available as Electronic Program Guide (EPG) data;
   processing means for forming sets of said attributes in response to said user selecting at least two of said programs having shared attributes, wherein each of said sets comprises at least two of said attributes;
   searching means for performing a search for programs with attributes that include all attributes of at least one of said sets; and
   on-screen display means for displaying to said user programs with attributes that include all the attributes of at least one of said sets as program recommendations upon entry of a user request for program recommendations.

9. A recommendation system according to claim 8, wherein said second attributes include a mood being experienced by said user.

10. A recommendation system according to claim 8, wherein said program recommendations are based on the programs with the greatest number of attributes included in said sets.

11. A recommendation system according to claim 8, further comprising:
   means for associating a value with each set, said value representing the number of programs selected by said user including the attributes in said set, wherein said search is performed for programs with attributes that include the attributes of the set with a highest value.

12. A recommendations system according to claim 11, wherein said program recommendations are further based on the programs with the greatest number of attributes included in said sets.

13. A recommendation system according to claim 8, wherein said second attributes further include information associated with the viewing of programs.

14. A recommendation system according to claim 13, wherein said information associated with the viewing includes one or more of time of day and day of week information.

* * * * *

UNITED STATES PATENT AND TRADEMARK OFFICE
CERTIFICATE OF CORRECTION

PATENT NO. : 7,188,355 B1
APPLICATION NO. : 09/668465
DATED : March 6, 2007
INVENTOR(S) : Prokopenko et al.

It is certified that error appears in the above-identified patent and that said Letters Patent is hereby corrected as shown below:

TITLE PAGE:
(57) Abstract, Line 6, "including" should read -- includes --; and
(57) Abstract, Line 21, "availability" should read -- availability of --.

DRAW SHEET 23:
FIG. 8, "Has" should read -- Have --.

DRAW SHEET 24:
FIG. 9A, "Has" should read -- Have --.

DRAW SHEET 26:
FIG. 9C, "Has" should read -- Have --.

COLUMN 5:
Line 35, "(LAS)" should read -- (IAS) --; and
Line 44, "selection;" should read -- selections; --.

COLUMN 6:
Line 10, "LAS 35" should read -- IAS 35 --;
Line 15, "LAS 35." should read -- IAS 35. --; and
Line 29, "LAS 35." should read -- IAS 35. --.

COLUMN 9:
Table 2, "SendRecommendationRequeat" should read
        -- SendRecommendationRequest --; and
Line 64, "10The" should read -- 10. The --.

COLUMN 11:
Line 4, " 'Nbk', ...)." should read -- 'Nhk',...). --;
Line 15, "OPList" should read -- GPList --;
Line 52, "Day = 'set')" should read -- Day = 'sat') --; and
Line 55, " 'Nbk']," should read -- 'Nhk'], --.

UNITED STATES PATENT AND TRADEMARK OFFICE
CERTIFICATE OF CORRECTION

PATENT NO. : 7,188,355 B1
APPLICATION NO. : 09/668465
DATED : March 6, 2007
INVENTOR(S) : Prokopenko et al.

It is certified that error appears in the above-identified patent and that said Letters Patent is hereby corrected as shown below:

COLUMN 13:
Line 2, "intersection." should read -- intersection, --; and
Line 36, "case in" should read -- case is --.

COLUMN 15:
Line 60, "been" should read -- be --.

COLUMN 16:
Line 44, "name" should read -- names --; and
Line 57, "name" should read -- names --.

COLUMN 23:
Line 16, "BUILD_DYMANIC_RULE" should read -- BUILD_DYNAMIC_RULE --;
Line 17, "BUILD_DYMANIC_RULE" should read -- BUILD_DYNAMIC_RULE --;
Line 31, "BUILD_DYMANIC_RULE" should read -- BUILD_DYNAMIC_RULE --; and
Line 45, "MANIC_RULE" should read -- NAMIC_RULE --.

COLUMN 25:
Line 37, "Sparestations" should read -- Sparcstations --.

COLUMN 28:
Line 3 claim 12, "recommendations" should read -- recommendation --.

Signed and Sealed this

Eighteenth Day of March, 2008

JON W. DUDAS
*Director of the United States Patent and Trademark Office*